(12) United States Patent
Kogiso

(10) Patent No.: US 12,718,642 B2
(45) **Date of Patent: *Aug. 25, 2026**

(54) SECURITY SYSTEM

(71) Applicant: Toshiba Tec Kabushiki Kaisha, Tokyo (JP)

(72) Inventor: Yoshiki Kogiso, Numazu (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/542,435

(22) Filed: Dec. 15, 2023

(65) Prior Publication Data

US 2024/0119774 A1 Apr. 11, 2024

Related U.S. Application Data

(63) Continuation of application No. 17/832,174, filed on Jun. 3, 2022, now Pat. No. 11,887,426.

(30) Foreign Application Priority Data

Aug. 2, 2021 (JP) ................................ 2021-126664

(51) Int. Cl.
*G07C 9/29* (2020.01)
*G08B 21/18* (2006.01)
(Continued)

(52) U.S. Cl.
CPC ............ *G07C 9/29* (2020.01); *G08B 21/182* (2013.01); *H04N 1/00278* (2013.01);
(Continued)

(58) Field of Classification Search
CPC .... G07C 9/29; G08B 21/182; H04N 1/00278; H04N 1/00342; H04N 1/32101; H04N 2201/3269
(Continued)

(56) References Cited

U.S. PATENT DOCUMENTS

| | | | | |
|---|---|---|---|---|
| 6,179,336 B1 * | 1/2001 | Peterson | ................ | B42D 15/08 281/3.1 |
| 6,394,356 B1 * | 5/2002 | Zagami | .................. | G07C 9/253 235/382 |

(Continued)

FOREIGN PATENT DOCUMENTS

| | | |
|---|---|---|
| JP | 2007-141146 A | 6/2007 |
| JP | 2008-021263 A | 1/2008 |

(Continued)

OTHER PUBLICATIONS

Extended European Search Report dated Dec. 19, 2022 issued in EP Application No. 22188244.2, 9 pages.

(Continued)

*Primary Examiner* — Zhen Y Wu
(74) *Attorney, Agent, or Firm* — FOLEY & LARDNER LLP

(57) ABSTRACT

A security management apparatus includes a receiver, a printer, and a notifier. The receiver acquires, at an entrance of a facility, information about a visitor to a visiting destination of the facility. The information includes a stay permitted time at the visiting destination and at least one of an attribute, relation information, or a visiting purpose. The printer generates a portable medium that includes the information and the stay permitted time and records an image allowing distinguishing of content of the information. The notifier is configured to receive the stay permitted time from one or more readers disposed at the facility and is configured to read the stay permitted time from the portable medium in a noncontact manner. The notifier, in response to the stay permitted time being elapsed, warns the visitor who passes a disposition position of the one or more readers.

21 Claims, 14 Drawing Sheets

(51) Int. Cl.
*H04N 1/00* (2006.01)
*H04N 1/32* (2006.01)

(52) U.S. Cl.
CPC ..... *H04N 1/00342* (2013.01); *H04N 1/32101* (2013.01); *H04N 2201/3269* (2013.01)

(58) Field of Classification Search
USPC ........................................................ 340/539.1
See application file for complete search history.

(56) References Cited

U.S. PATENT DOCUMENTS 9,990,786 B1* 6/2018 Ziraknejad .............. G06F 21/45
10,169,939 B2* 1/2019 He .......................... G07C 9/29
10,304,268 B1* 5/2019 Ghenn ..................... G07C 9/29
10,713,872 B1* 7/2020 Milliorn ............... G06K 7/1417
10,789,846 B1* 9/2020 Vallance ................ G06Q 10/02
10,990,499 B2* 4/2021 Moeller ................ H04L 9/3234
10,991,190 B1* 4/2021 Luthra ..................... G07C 9/27
11,308,747 B1* 4/2022 Sahani ..................... G07C 9/28
11,468,408 B2* 10/2022 Ma ..................... G05B 23/0218
2004/0099731 A1* 5/2004 Olenick .................. G07F 17/26 235/380
2005/0093675 A1* 5/2005 Wood ....................... G07C 9/37 340/5.21
2005/0171787 A1* 8/2005 Zagami ................ G06Q 50/265 705/325
2006/0057325 A1* 3/2006 Hodsdon ................. G09F 21/02 428/40.1
2006/0266820 A1* 11/2006 Newburry .............. G07C 9/253 235/380
2007/0115092 A1* 5/2007 Hsu .......................... G07C 9/28 340/5.6
2009/0039152 A1* 2/2009 Prpic ........................ G07C 9/20 235/380
2009/0058594 A1 3/2009 Nakagawa et al.
2011/0093928 A1* 4/2011 Nakagawa ........... G06Q 10/063 726/4
2017/0352009 A1* 12/2017 Katz ...................... G06Q 10/20
2020/0202650 A1* 6/2020 Moeller ................ H04L 9/0897
2020/0233389 A1* 7/2020 Ma ........................ H04L 9/3247
2020/0312070 A1* 10/2020 Baczek .................... G07C 9/20
2021/0192859 A1* 6/2021 Watanabe ................ G07C 1/12
2021/0375084 A1* 12/2021 Aubrey .................... G07C 9/27
2021/0390647 A1* 12/2021 Chen .................. G06Q 30/0611
2023/0125828 A1* 4/2023 Akutsu .................. G06Q 10/10 340/5.52
2023/0316835 A1* 10/2023 Saito .................. G07C 9/00563 340/5.82

FOREIGN PATENT DOCUMENTS

JP 2010-211703 A 9/2010
JP 2018-124622 A 8/2018
WO WO-2004/032023 A2 4/2004
WO WO-2006/049181 A1 5/2006
WO WO-2019/139663 A1 7/2019

OTHER PUBLICATIONS

Non-Final Office Action on U.S. Appl. No. 17/832,174 DTD Jun. 30, 2023.
Notice of Allowance on U.S. Appl. No. 17/832,174 DTD Sep. 18, 2023.
Notice of Reasons for Refusal dated Jun. 24, 2025 issued in JP Application No. 2021-126664, with English translation, 6 pages.
Communication pursuant to Article 94(3) EPC dated Oct. 20, 2025 issued in EP Application No. 22188244.2, 9 pages.

* cited by examiner 1
10
IMAGE FORMING APPARATUS
11
SYSTEM CONTROLLER
111
PROCESSOR
112
MEMORY
13
UI
14
IMAGE FORMING UNIT
15
RFID READER WRITER
16
TIMEPIECE
17
SPEAKER
18
CAMERA
19
COMMUNICATION DEVICE
12
NW I/F
70
40
AUTO-LOCK DOOR
50
RFID READER
60
SPEAKER
20
RFID GATE
21
NW I/F
22
RFID READER
23
SPEAKER
30
SENSOR
80
DWELLING UNIT
81
NW I/F
82
INTERCOM
83
RFID WRITER
84
PC
85
SMART TERMINAL

| DWELLING UNIT ID | RESIDENT ID | ABSENCE SCHEDULED PERIOD | ABSENCE PRETENSE SETTING | OFF-LIMIT POSITION | PACKAGE DROP F |
| --- | --- | --- | --- | --- | --- |

| VISITOR ID | VISITING DESTINATION | BASIC INFORMATION | STAY PERMITTED TIME | FACE IMAGE |
| --- | --- | --- | --- | --- |

| SCHEDULED DATE AND TIME | VISITING DESTINATION | BASIC INFORMATION | STAY PERMITTED TIME | ONETIME PASSWORD |
|---|---|---|---|---|

| VISITOR ID | VISITING DESTINATION | BASIC INFORMATION | VISITING TIME | STAY PERMITTED TIME |
|---|---|---|---|---|

Figure 13:
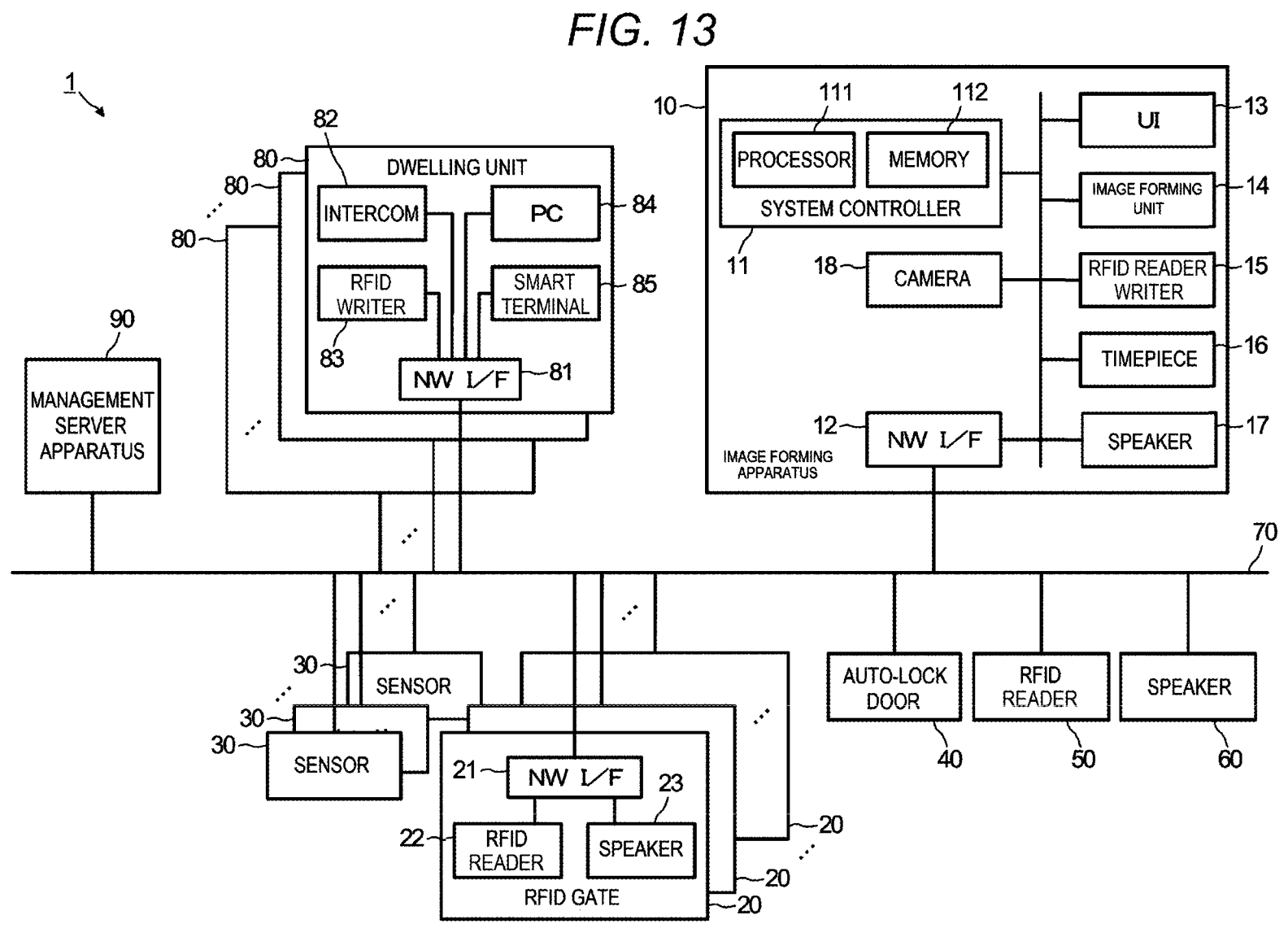

10 IMAGE FORMING APPARATUS
11 SYSTEM CONTROLLER
111 PROCESSOR
112 MEMORY
12 NW I/F
13 UI
14 IMAGE FORMING UNIT
15 RFID READER WRITER
16 TIMEPIECE
17 SPEAKER
18 CAMERA

70

60 SPEAKER
50 RFID READER
40 AUTO-LOCK DOOR

20 RFID GATE
21 NW I/F
22 RFID READER
23 SPEAKER

30 SENSOR

80 DWELLING UNIT
81 NW I/F
82 INTERCOM
83 RFID WRITER
84 PC
85 SMART TERMINAL

90 MANAGEMENT SERVER APPARATUS

FIG. 18

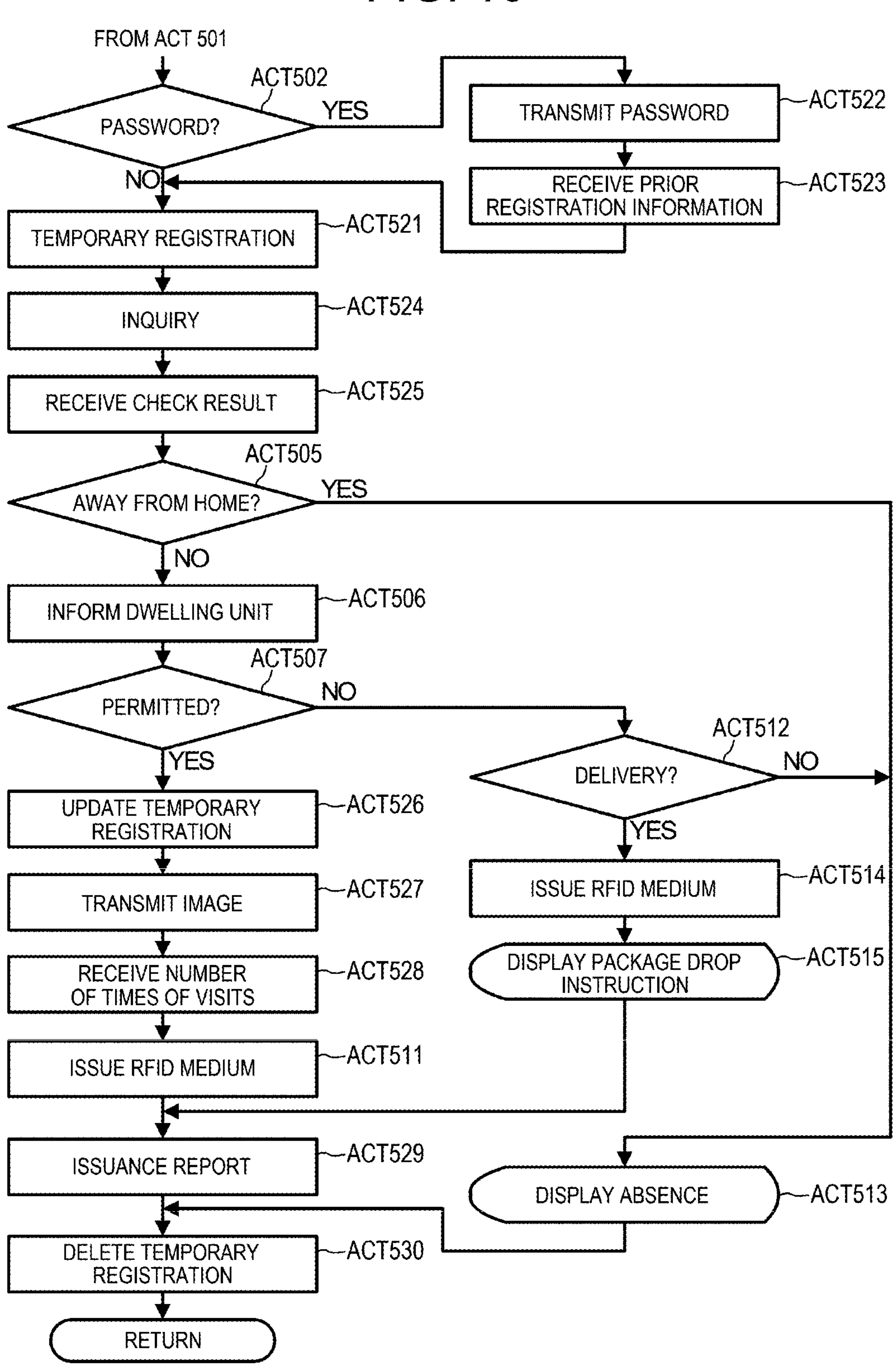
FIG. 19
FROM ACT 501
ACT502
PASSWORD?
YES
NO
TRANSMIT PASSWORD
ACT522
RECEIVE PRIOR REGISTRATION INFORMATION
ACT523
TEMPORARY REGISTRATION
ACT521
INQUIRY
ACT524
RECEIVE CHECK RESULT
ACT525
ACT505
AWAY FROM HOME?
YES
NO
INFORM DWELLING UNIT
ACT506
ACT507
PERMITTED?
NO
YES
ACT512
DELIVERY?
NO
YES
UPDATE TEMPORARY REGISTRATION
ACT526
ISSUE RFID MEDIUM
ACT514
TRANSMIT IMAGE
ACT527
DISPLAY PACKAGE DROP INSTRUCTION
ACT515
RECEIVE NUMBER OF TIMES OF VISITS
ACT528
ISSUE RFID MEDIUM
ACT511
ISSUANCE REPORT
ACT529
DISPLAY ABSENCE
ACT513
DELETE TEMPORARY REGISTRATION
ACT530
RETURN

SECURITY SYSTEM

CROSS-REFERENCE TO RELATED APPLICATIONS

This application is based upon and claims the benefit of priority from Japanese Patent Application No. 2021-126664, filed on Aug. 2, 2021, and U.S. application Ser. No. 17/832,174, filed on Jun. 3, 2022, the entire contents of each of which are incorporated herein by reference.

FIELD

Embodiments described herein relate generally to a security management apparatus.

BACKGROUND

In an apartment building such as a condominium, a dedicated security system including an auto-lock door is sometimes set in an apartment building entrance separately from entrances of dwelling units of residents. The system keeps security by allowing a visitor to any one of the dwelling units to unlock the auto-lock door on condition that the visitor inputs a visiting destination dwelling unit number from a security terminal set near the auto-lock door and obtains permission of a visiting destination resident.

DESCRIPTION OF THE DRAWINGS

FIG. 13 is a diagram for explaining a configuration example of a security system including a security management apparatus according to a second embodiment;

FIG. 18 is a flowchart for explaining an example of a main operation of the management server apparatus;

FIG. 19 is a flowchart for explaining an example of the operation of visitor processing in FIG. 17;

FIG. 20 is a flowchart for explaining an example of the operation of image formation processing in FIG. 18; and FIG. 21 is a flowchart for explaining an example of the operation of image formation processing of a security management apparatus according to a third embodiment.

DETAILED DESCRIPTION

In typical devices, if the permitted visitor unlocks the auto-lock door and enters the apartment building, a security system does not prevent the permitted visitor from visiting a dwelling unit other than the visiting destination.

The foregoing is not limited to the apartment building such as a condominium and is the same in a facility including a plurality of visiting destinations such as a research facility, a factory, or a company.

One of the objectives of the embodiments disclosed herein is to improve security in a facility including a plurality of visiting destinations.

In general, according to one embodiment, a security management apparatus includes an acquiring unit or receiver, an issuing unit or printer, and a warning unit or notifier. The acquiring unit acquires, in an entrance of a facility including a plurality of visiting destinations, about a visitor to a specific visiting destination of the facility, basic information including at least one of an attribute, relation information, and a visiting purpose and a stay permitted time at the visiting destination. The issuing unit or printer issues or generates a portable medium that stores the basic information and the stay permitted time acquired by the acquiring unit and records, on a surface of the portable medium, an image capable of distinguishing content of the basic information. The warning unit or notifier receives the stay permitted time from each of one or more reading units or readers disposed at the facility and configured to read the stay permitted time from the portable medium in a noncontact manner and, if the stay permitted time already elapsed, warns the visitor who passes a disposition position of the reading unit or reader. The security management apparatus may include one processor or multiple processors.

Security management apparatuses according to embodiments are explained below with reference to the drawings in an example in which the security management apparatuses are applied to an apartment building such as a condominium. It goes without saying that the embodiments are not limited to the application to the apartment building and can be applied to other facilities as well.

First Embodiment

Figure 1:
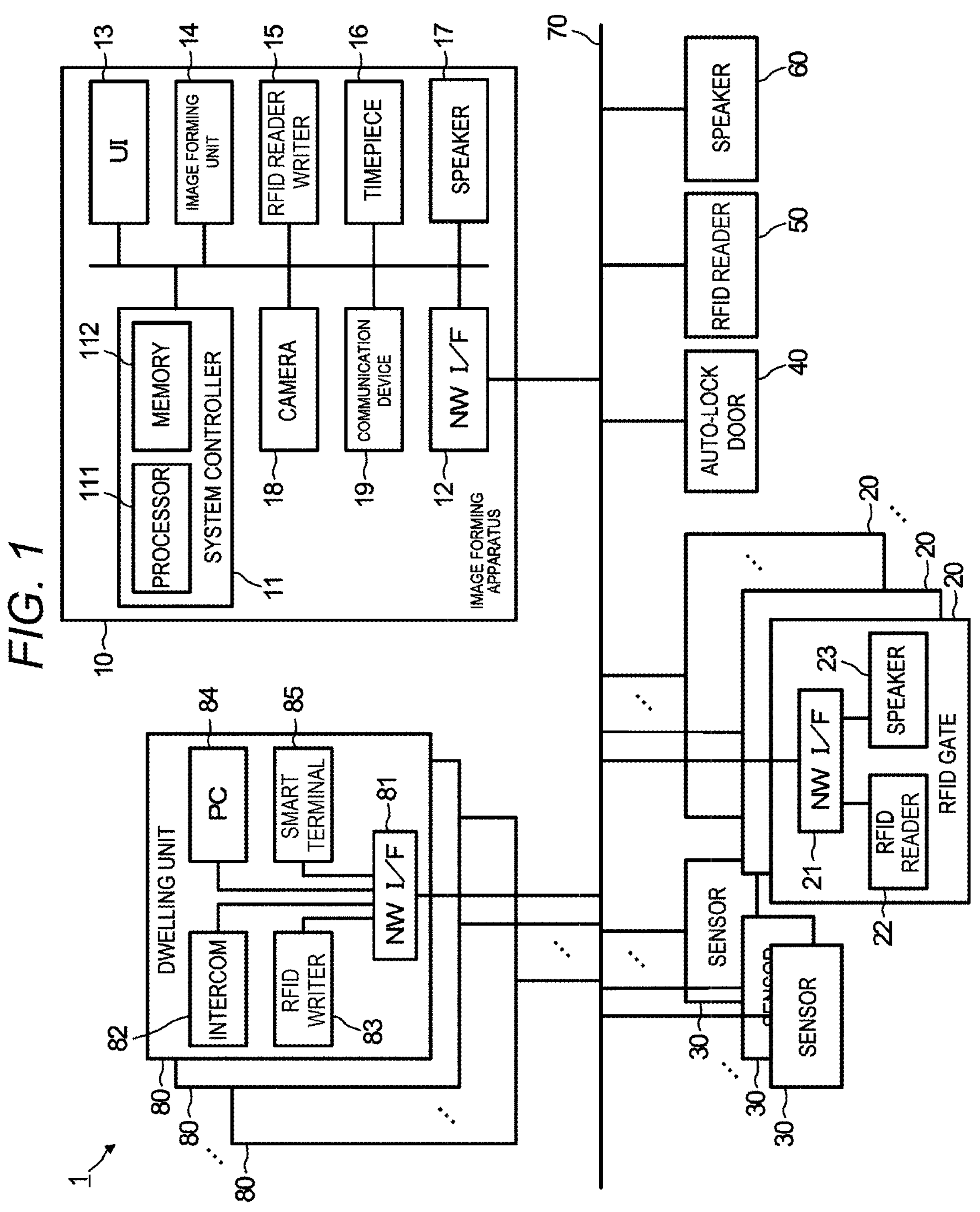
FIG. 1 is a diagram for explaining a configuration example of a security system including an image forming apparatus functioning as a security management apparatus according to a first embodiment.

FIG. 1 is a diagram for explaining a configuration example of a security system 1 including an image forming apparatus 10 functioning as a security management apparatus according to a first embodiment.

The security system 1 includes the image forming apparatus 10 functioning as the security management apparatus according to the first embodiment, one or more RFID gates 20, one or more sensors 30, an auto-lock door 40, an RFID reader 50, and a speaker 60. The image forming apparatus 10, the RFID gates 20, the sensors 30, the auto-lock door 40, the RFID reader 50, and the speaker 60 are connected to one another via a network 70. Equipment in respective dwelling units 80 in an apartment building or apartment house is also connected to the network 70.

The image forming apparatus 10 is set in an entrance hall of the apartment house instead of the security terminal. The image forming apparatus 10 is, for example, a multifunction printer (MFP) that performs various kinds of processing such as image formation while conveying a printing medium. The image forming apparatus 10 is, for example, a printer of a solid-state scanning type for scanning an LED array (for example, an LED printer) that performs various kinds of processing such as image formation while conveying a printing medium. Further, the image forming apparatus 10 may be a printer of an inkjet type (an inkjet printer) that scans an inkjet head that ejects ink or a printer of another type.

For example, the image forming apparatus 10 charges a photoconductive drum and irradiates the photoconductive drum with light corresponding to image data for printing to thereby form an electrostatic latent image on the photoconductive drum. The image forming apparatus 10 causes toner to adhere to the latent image formed on the photoconductive drum and transfers the toner adhering to the latent image onto a printing medium to form a toner image on the printing medium. The image forming apparatus 10 applies heat and pressure to the printing medium, onto which the toner image is transferred, to thereby fix the toner image on the printing medium.

The image forming apparatus 10 includes a system controller 11, a network interface 12, a user interface or input interface 13, an image forming unit or image forming processor 14, an RFID reader writer 15, a timepiece 16, a speaker 17, a camera 18, and a communication device or communication processor 19. In FIG. 1, network interface is abbreviated as NW I/F and user interface is abbreviated as UI. The system controller 11, the network interface 12, the user interface 13, the image forming unit 14, the RFID reader writer 15, the timepiece 16, the speaker 17, the camera 18, and the communication device or communication processor 19 are housed in a not-illustrated housing.

The system controller 11 controls the entire image forming apparatus 10. The system controller 11 includes, for example, a processor 111 and a memory or memory circuit 112.

The processor 111 is an arithmetic element (for example, a CPU) that executes arithmetic processing. The processor 111 is an entity of the operation of the system controller 11. The processor 111 performs various kinds of processing based on data such as programs stored in the memory 112. The processor 111 executes the programs stored in the memory 112 to thereby function as a control unit capable of executing various operations. For example, the processor 111 executes a security management program stored in the memory 112 to thereby control the units of the security system 1.

The memory 112 is a storage device that stores programs, data used in the programs, and the like. The memory 112 temporarily stores, for example, data being processed by the processor 111. The memory 112 is configured as a nonvolatile memory and a volatile memory.

The network interface 12 is an interface for communicating with the RFID gates 20, the sensors 30, the auto-lock door 40, the RFID reader 50, the speaker 60, and the equipment in the dwelling units 80 via the network 70.

The user interface 13 includes a display and an operation interface not illustrated in FIG. 1. The display displays a screen according to a video signal input from the system controller 11. For example, the display displays a screen for causing a visitor to the dwelling unit 80 to input basic information. The operation interface includes various operation members. The operation interface supplies operation signals corresponding to operation of the operation members to the system controller 11. The operation members are, for example, a touch sensor, ten keys, various action keys, and the keyboard. The touch sensor is, for example, a resistive film type touch sensor or a capacitance type touch sensor. The touch sensor acquires information indicating a position designated in a certain region. The touch sensor is configured as a touch panel integrally with a display to thereby input, to the system controller 11, a signal indicating a touched position on a screen displayed on the display. The user interface 13 may include a microphone that acquires voice uttered by a visitor, recognizes content of the acquired voice, and input basic information.

The basic information can include an attribute, relation information, a visit purpose, and the number of visiting people. The attribute is information indicating a job type of a visitor such as sales, delivery, and/or repairing. The relation information is information indicating a relation with a resident of the dwelling unit 80 at a visiting destination such as a relative or an acquaintance. In the basic information, not all of the attribute, the relation information, and the visit purpose are essential. The basic information may be at least one of them. The basic information may further include a name of the visitor and a department to which the visitor belongs in a company or the like.

The image forming unit 14 forms, based on the control by the system controller 11, an image capable of distinguishing the content of the basic information on the surface of an RFID medium, which is a printing medium. The image forming unit 14 only may change, for example, according to the basic information, a color or a pattern of the image capable of distinguishing the content of the basic information.

The image forming unit 14 includes, for example, a process unit (processor), an exposing device (exposer), a transfer mechanism, a fixing device, and a conveying unit (conveyor).

The process unit includes a photoconductive drum, an electrifying charger, and a developing device (developer).

The photoconductive drum is a photoconductive body including a cylindrical drum and a photoconductive layer formed on the outer circumferential surface of the drum. The photoconductive drum is rotated at constant speed by a not-illustrated driving mechanism.

The electrifying charger uniformly charges the surface of the photoconductive drum. For example, the electrifying charger applies a voltage to the photoconductive drum using a charging roller to thereby charge the photoconductive drum to uniform negative polarity potential.

The developing device is a device that causes toner to adhere to the photoconductive drum. The developing device includes a developer container, an agitating mechanism, a developing roller, and a doctor blade. The developer container is a container that receives and stores toner sent out from a toner cartridge. A carrier is stored in advance in the developer container. The toner sent out from the toner cartridge is agitated together with the carrier by the agitating mechanism to thereby form a developer in which the toner and the carrier are mixed. The carrier is stored in the developer container at a manufacturing time of the developing device. The developing roller rotates in the developer container to thereby cause the developer to adhere to the surface of the developing roller. The doctor blade is a member disposed at a predetermined interval from the surface of the developing roller. The doctor blade removes a part of the developer adhering to the surface of the rotating developing roller. Consequently, a layer of the developer having thickness corresponding to the interval between the doctor blade and the surface of the developing roller is formed on the surface of the developing roller.

The exposing device includes a plurality of light emitting elements. The exposing device irradiates the charged photoconductive drum with light emitted from the light emitting elements to thereby form a latent image on the photoconductive drum. The light emitting elements are, for example, light emitting diodes (LEDs). One light emitting element is configured to irradiate one point on the photoconductive drum with light. The plurality of light emitting elements are arrayed in a main scanning direction, which is a direction parallel to a rotation axis of the photoconductive drum. The exposing device irradiates, with the plurality of light emitting elements arrayed in the main scanning direction, the photoconductive drum with light to thereby form a latent image for one line on the photoconductive drum. Further, the exposing device continuously irradiates the rotating photoconductive drum with light to thereby form latent images for a plurality of lines.

In the configuration explained above, if the surface of the photoconductive charged by the electrifying charger is irradiated with light from the exposing device, an electrostatic latent image is formed on the surface of the photoconductive drum. If the layer of the developer formed on the surface of the developing roller approaches the surface of the photoconductive drum, the toner included in the developer adheres to the latent image formed on the surface of the photoconductive drum. Consequently, a toner image is formed on the surface of the photoconductive drum.

The transfer mechanism is a component that transfers the toner image formed on the surface of the photoconductive drum onto an RFID medium, which is a printing medium. The transfer mechanism includes a primary transfer belt, a secondary transfer belt, and a plurality of other rollers. The transfer mechanism receives, on the outer circumferential surface of the primary transfer belt, the toner image formed on the surface of the photoconductive drum. The transfer mechanism conveys the toner image on the outer circumferential surface of the primary transfer belt to a transfer nip where the secondary transfer roller and the outer circumferential surface of the primary transfer belt are closely attached. The transfer mechanism causes the RFID medium supplied by the transfer unit to pass through the transfer nip to thereby transfer the toner image on the outer circumferential surface of the primary transfer belt onto the surface of the RFID medium.

The fixing device is a component that fixes the toner image transferred onto the RFID medium surface on the RFID medium surface. The fixing device includes a heating member (a heat roller) that applies heat to the RFID medium, a pressurizing member (a press roller) that applies pressure to the RFID medium, and a heater that heats the heat roller. The press roller applies pressure to the heat roller to thereby form a fixing nip where the press roller and the heat roller are closely attached. The fixing device causes the RFID medium, onto which the toner image is transferred by the transfer mechanism, to pass through the fixing nip to thereby apply heat and pressure to the RFID medium. Consequently, the fixing device fixes the toner image formed on the RFID medium surface. The RFID medium passed through the fixing nip is discharged to the outside of the image forming apparatus 10 by the conveying unit.

The conveying unit supplies RFID media, which are printing media, stored in a not-illustrate storing unit, which stores the RFID media, to the transfer mechanism and the fixing device one by one and discharges the RFID medium, on which an image is formed, to a discharge tray on the outside of the housing of the image forming apparatus 10.

The RFID reader writer 15 writes, based on the control by the system controller 11, in an RFID included in the RFID medium, information such as the basic information input to the user interface 13 by the visitor. The RFID medium is a printing medium having a form of a badge, a wristband, or a sticker.

The RFID reader writer 15 may write the information in the RFID at any timing with respect to timing of image formation by the image forming unit 14. That is, the RFID reader writer 15 may write the information in the RFID in any time during conveyance of the RFID medium from the storing unit to the image forming unit 14, during image formation in the image forming unit 14, and during conveyance from the image forming unit 14 to the discharge tray. Before the RFID medium, on which the image is formed, is discharged to the discharge tray, the RFID reader writer 15 desirably checks whether the information written in the RFID can be correctly read out, discards the information if a deficiency is present, forms an image on another RFID medium, and writes the information in the other RFID medium.

As explained above, the image forming apparatus 10 can issue the RFID medium in which the information such as the basic information is written in the RFID and on the surface of which the image capable of distinguishing the content of the basic information is formed.

The timepiece 16 clocks the present date and time. The speaker 17 emits sound corresponding to an audio signal received from the system controller 11. The camera 18 captures a face image of a visitor who operates the user interface 13. The communication device 19 is an interface for communicating with external equipment via a communication network different from the network 70. The communication network includes, for example, the Internet, a public communication network, and a mobile communication network well known to the public.

The RFID gates 20 are disposed, for example, in front of entrances of the dwelling units 80. Further, the RFID gates 20 can be discretely disposed in passageways of the apartment house. The RFID gates 20 can be disposed, for example, in front of off-limit areas for residents optionally set by an administrator of the apartment house. Further, if a delivery box for storing a delivered package is set or a package drop position is determined in front of or behind a boundary position between the entrance hall and a passageway, the RFID gate 20 can be disposed in the position.

Each of the RFID gates 20 includes a network interface 21, an RFID reader 22, and a speaker 23.

The network interface 21 is an interface for communicating with the image forming apparatus 10 via the network 70.

The RFID reader 22 reads, from an RFID medium issued by the image forming apparatus 10 and carried by a visitor passing through the RFID gate 20, with a short range wireless communication scheme in a noncontact manner, information such as basic information of the visitor stored in an RFID. The short range wireless communication scheme is, for example, short range wireless communication defined by ISO/IEC18000-63. The short range wireless communication scheme between the RFID reader 22 and the RFID medium may be any other communication scheme. The information stored in the RFID read by the RFID reader 22 is transmitted from the network interface 21 to the image forming apparatus 10 through the network 70.

The speaker 23 emits sound corresponding to an audio signal transmitted from the image forming apparatus 10 through the network 70 and received by the network interface 21.

The sensors 30 can be provided to correspond to the RFID gates 20. The sensors 30 are, for example, human sensors that detect, by a detector, persons passing through the IFID gates 20 and cameras, imaging ranges of which are the RFID gates 20. Sensing information of the sensors 30 is transmitted to the image forming apparatus 10 through the network 70.

The auto-lock door 40 is provided in the boundary between the entrance hall of the apartment house and a passageway leading to the dwelling units 80 of the apartment house. A visitor cannot visit the dwelling units 80 unless the visitor passes through the auto-lock door 40. The image forming apparatus 10 can unlock the auto-lock door 40 through the network 70.

The RFID reader 50 and the speaker 60 are disposed in positions near the auto-lock door 40 in the entrance hall. The speaker 60 may be provided in a housing of the RFID reader 50. The RFID reader 50 reads, from the RFID medium issued by the image forming apparatus 10, the information such as the basic information of the visitor stored in the RFID and transmits the read information to the image forming apparatus 10 through the network 70. The speaker 60 emits sound corresponding to the audio signal transmitted from the image forming apparatus 10 through the network 70.

The auto-lock door 40 is sometimes not provided depending on a form of an apartment house. In such a case, the RFID reader 50 and the speaker 60 are disposed in a boundary position between an entrance hall and a passageway of the apartment house and the image forming apparatus 10 is disposed in a position near the RFID reader 50 and the speaker 60 in the entrance hall.

In each of the dwelling units 80, a network interface 81, an intercom 82, and an RFID writer 83 are set.

The network interface 81 is an interface for communicating with the image forming apparatus 10 via the network 70.

The intercom 82 includes a display, an operation member, a speaker, a microphone, and a camera not illustrated in FIG. 1. The display displays a screen according to a video signal transmitted from the image forming apparatus 10 and received by the network interface 81 through the network 70. For example, the display displays a face image of a visitor captured by the camera 18 of the image forming apparatus 10. The operation member includes, for example, a touch sensor, ten keys, various function keys, and a keyboard. An operation signal corresponding to operation of the operation member is transmitted to the image forming apparatus 10 by the network interface 81 through the network 70. The speaker emits sound corresponding to an audio signal transmitted from the image forming apparatus 10 and received by the network interface 81 through the network 70. For example, the speaker outputs voice of the visitor acquired by the microphone of the image forming apparatus 10. The microphone acquires voice uttered by a resident. An audio signal corresponding to the acquired voice is transmitted to the image forming apparatus 10 by the network interface 81 through the network 70. The voice of the resident corresponding to the audio signal can be output by the speaker 17 of the image forming apparatus 10. The camera captures a face image of the resident. A video signal corresponding to the captured image is transmitted to the image forming apparatus 10 by the network interface 81 through the network 70. The face image of the resident corresponding to the video signal is displayed by the display of the user interface 13 of the image forming apparatus 10.

The RFID writer 83 can rewrite information issued by the image forming apparatus 10 and stored in an RFID of an RFID medium carried by the visitor. The RFID writer 83 transmits, with the network interface 81, to the image forming apparatus 10 through the network 70, a registration instruction for rewrite content including rewrite content of the RFID indicating which information of which RFID is rewritten and how the information is rewritten.

The dwelling unit 80 can include a personal computer (hereinafter referred to as PC) 84 and/or a smart terminal 85 owned by a resident and connectable to the network interface 81 according to necessity. The smart terminal 85 includes a smartphone, a smartwatch, a notebook PC, a tablet PC, and the like. The PC 84 and the smart terminal 85 may be connected to the network interface 81 by wired connection or by wireless communication. A scheme of the wireless communication is, for example, short range wireless communication, Wi-Fi (registered trademark), Wi-Fi Direct (registered trademark), or Bluetooth Low Energy (registered trademark) defined by ISO/IEC14443 or ISO/IEC18092. The communication scheme of the wireless communication between the PC 84 and the smart terminal 85 and the network interface 81 may be any other scheme.

The smart terminal 85 is sometimes carried by a resident and taken out to the outside of the dwelling unit 80 and further to the outside of the apartment house. The image forming apparatus 10 is capable of communicating, using the communication device 19, through a communication network such as the Internet, with the smart terminal 85 taken out to the outside.

Figures 2, 3, 4:
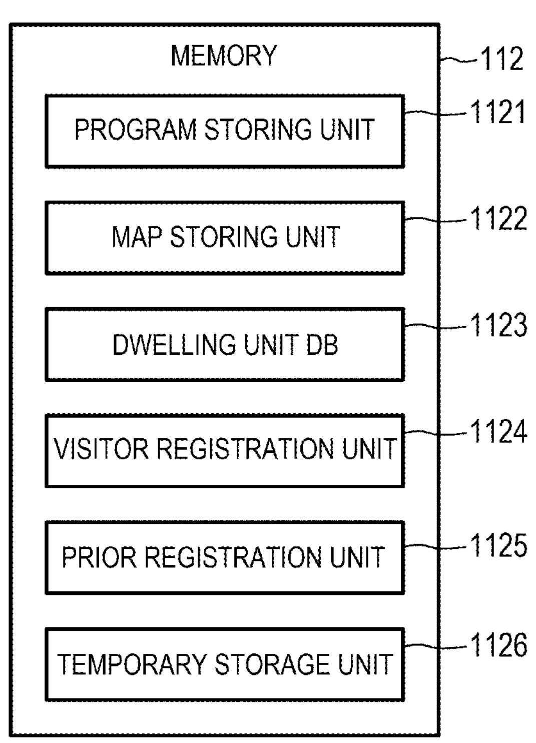
FIG. 2 is a diagram for explaining a configuration example of a memory included in the image forming apparatus.
FIG. 3 is a diagram for explaining an item example of a record of dwelling unit information accumulated in a dwelling unit database included in the memory.
FIG. 4 is a diagram for explaining an item example of a record of visitor information stored in a visitor registration unit included in the memory.

FIG. 2 is a diagram for explaining a configuration example of the memory 112 of the image forming apparatus 10. The memory 112 includes a program storing unit or program storage 1121, a map storing unit or map storage 1122, a dwelling unit database 1123, a visitor registration unit or visitor registrar 1124, a prior registration unit or prior registrar 1125, and a temporary storage unit or temporary storage 1126. In FIG. 2, database is abbreviated as DB. The program storing unit 1121, the map storing unit 1122, the dwelling unit database 1123, the visitor registration unit 1124, and the prior registration unit 1125 are configured in a nonvolatile memory. The temporary storage unit 1126 is configured in a volatile memory. The temporary storage unit 1126 is used to temporarily store various data and information generated by the processor 111 halfway in processing.

The program storing unit 1121 stores programs for causing the processor 111 to perform the operation of the image forming apparatus 10. The programs include a security management program for causing the processor 111 to perform the operation of the security management apparatus according to the first embodiment.

The map storing unit 1122 stores map information of the apartment house. The map information indicates a positional relation among the entrance hall, the passageways, and the dwelling units 80. Further, the map information includes disposition positions of the RFID gates 20.

The dwelling unit database 1123 stores dwelling unit information, which is information about residents of the dwelling units 80. FIG. 3 is a diagram for explaining an item example of a record of dwelling unit information for each of residents in the dwelling unit database 1123. The record includes a dwelling unit ID, a resident ID, an absence scheduled period, absence pretense setting, an off-limit position, and a package drop flag. In FIG. 3, flag is abbreviated as F.

The dwelling unit ID is identification information for uniquely identifying the dwelling unit 80. The dwelling unit ID can be, for example, a dwelling unit number. The resident ID is identification information for uniquely identifying each of residents of the dwelling unit 80. The dwelling unit ID and the resident ID may be combined as one ID.

The absence scheduled period is information indicating a period in which the resident specified by the resident ID is absent in the dwelling unit 80. The absence scheduled period can be, for example, a scheduled date and time when the resident returns to the dwelling unit 80 from an outing. The absence scheduled period is transmitted from the intercom 82, the PC 84, or the smart terminal 85 of the dwelling unit 80 to the image forming apparatus 10 by the network interface 81 through the network 70. The resident can transmit a new absence scheduled period or an absence scheduled period to be changed to the image forming apparatus 10 from the smart terminal 85 via a communication network in the dwelling unit 80 or at a visiting destination. In the image forming apparatus 10, the transmitted absence scheduled period is received by the network interface 12 or the communication device 19. The processor 111 registers the absence scheduled period in a record of dwelling unit information of the relevant resident in the dwelling unit database 1123.

The absence pretense setting is information indicating a specific visitor for whom the resident wants to pretend to be absent. As the absence pretense setting, for example, a salesperson and a specific acquaintance can be set. The absence pretense setting can designate all visitors to prevent a child from carelessly responding to sales or the like if only the child is present in the dwelling unit 80. The absence pretense setting is transmitted from the intercom 82, the PC 84, or the smart terminal 85 of the dwelling unit 80 to the image forming apparatus 10 by the network interface 81 through the network 70. Alternatively, the resident transmits the absence pretense setting to the image forming apparatus 10 from the smart terminal 85 via a communication network in the dwelling unit 80 or a visiting destination. In the image forming apparatus 10, the transmitted absence pretense setting is received by the network interface 12 or the communication device 19. The processor 111 registers the absence pretense setting in the record of the dwelling unit information of the relevant resident in the dwelling unit database 1123.

The off-limit position is information indicating a position where entrance of the resident is prohibited in the apartment house. The administrator of the apartment house can input the off-limit position by, for example, operating the user interface 13 of the image forming apparatus 10. Alternatively, the administrator transmits the off-limit position with the network interface 81 from the intercom 82, the PC 84, or the smart terminal 85 of the dwelling unit 80 of the administrator or the dwelling unit 80 used as a control room to the image forming apparatus 10 through the network 70 or from the smart terminal 85 to the image forming apparatus 10 via a communication network. In the image forming apparatus 10, the processor 111 registers, in the record of the dwelling unit information of the relevant resident in the dwelling unit database 1123, the off-limit position from the administrator input by the user interface 13 or received by the network interface 12 or the communication device 19.

The off-limit position may be able to be set by the resident. Then, the off-limit position can also be used to manage an area of activity of family members such as children of the resident. For example, all positions excluding the own dwelling unit 80 and a shared space or excluding the dwelling units 80 of friends of the family members are set as the off-limit position. If the resident sets the off-limit position, the resident may be able to register a contact to which, if a person concerned enters the off-limit position, the entrance of the person is informed. The contact may be added to the record of the dwelling unit information as a separate item. Such an off-limit position may include identification information for distinguishing the off-limit position designated by the administrator and the off-limit position set by the resident.

The package drop flag is a flag automatically set by the processor 111 if a deliverer stores a package addressed to the resident in a delivery box or leaves the package in a determined package drop position.

The visitor registration unit 1124 stores visitor information, which is information about a visitor. FIG. 4 is a diagram for explaining an item example of a record of visitor information for each of visitors in the visitor registration unit 1124. The record includes a visitor ID, a visiting destination, basic information, a stay permitted time, and a face image. The record is added every time the visitor operates the user interface 13.

The visitor ID is identification information for uniquely identifying the visitor information record and can be, for example, a serial number. In this embodiment, it does not particularly occur that the visitor is identified and the same ID is allocated to the same visitor.

The visiting destination is a dwelling unit ID indicating the dwelling unit 80 at the visiting destination input by the visitor using the user interface 13. Similarly, the basic information is basic information input by the visitor using the user interface 13. As explained above, the basic information can include an attribute, relation information, a visit purpose, and the number of visiting people. The basic information may further include a name of the visitor and a department to which the visitor belongs in a company or the like.

The stay permitted time is designated by a resident of the dwelling unit 80 at the visiting destination of the visitor and indicates until which hour the visitor may stay in the dwelling unit 80 or the apartment house. For example, in response to an inquiry from the image forming apparatus 10, the resident inputs, with the intercom 82, the PC 84, or the smart terminal 85, a date and time permitted to the visitor and transmits the date and time to the image forming apparatus 10 via the network 70 or the communication network. The processor 111 of the image forming apparatus 10 registers the received permitted data and time in the record of the dwelling unit information of the relevant resident in the dwelling unit database 1123. If the resident does not permit the visit of the visitor, the processor 111 can register, as the stay permitted time, the present date and time clocked by the timepiece 16.

The face image is a face image of the visitor captured by the camera 18 of the image forming apparatus 10. The record may include, in addition to the face image, a feature value of a face of the visitor extracted by the processor 111 with a well-known method. By using the feature value, it is possible to discriminate at high speed whether the present visitor visited the apartment house in the past.

Figures 5, 6, 7:
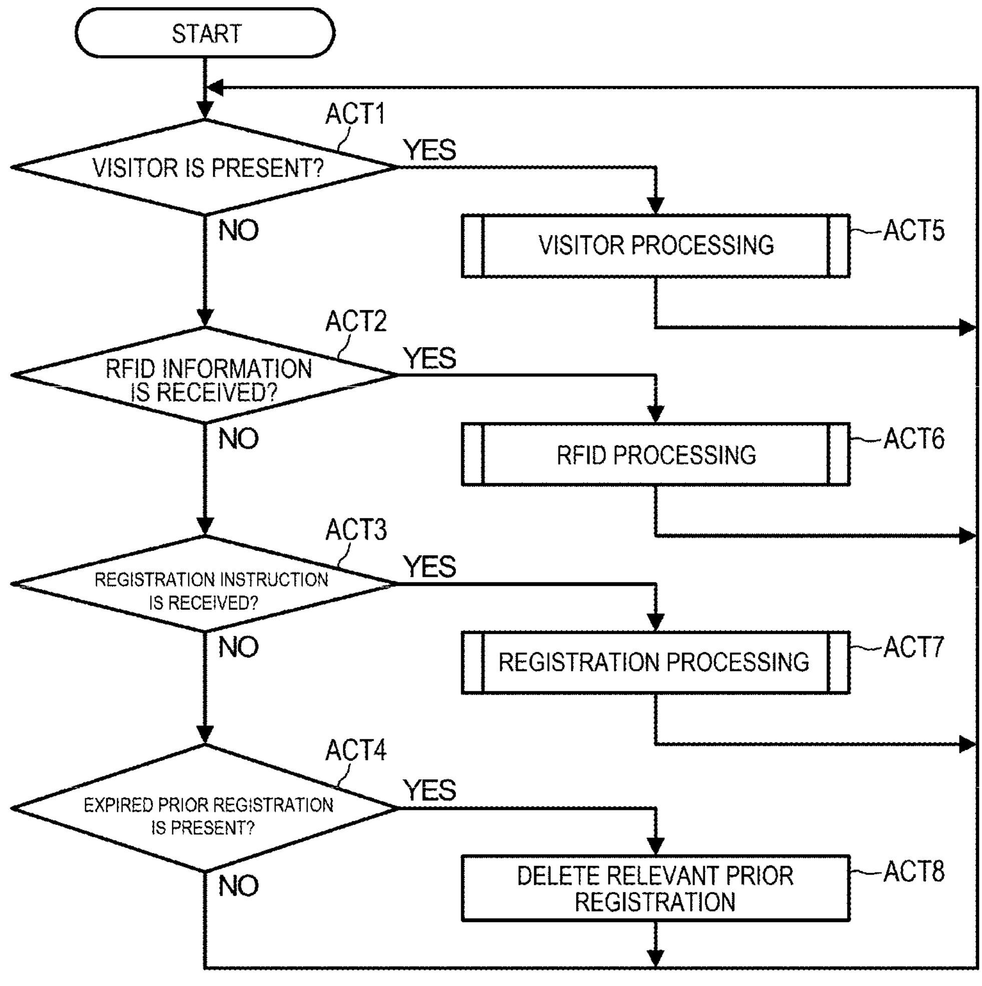
FIG. 5 is a diagram for explaining an item example of a record of prior registration information stored in a prior registration unit included in the memory.
FIG. 6 is a diagram for explaining an item example of RFID writing information stored in an RFID of an RFID medium issued by the image forming apparatus.
FIG. 7 is a flowchart for explaining an example of a main operation of the image forming apparatus.

If a visit of a visitor is known in advance, the prior registration unit 1125 stores prior registration information, which is information about the visitor. FIG. 5 is a diagram for explaining an item example of a record of prior registration information for each of visitors in the prior registration unit 1125. The record includes a scheduled date and time, a visiting destination, basic information, a stay permitted time, and a onetime password.

The scheduled date and time is a date and time when the visitor is scheduled to visit the apartment house. The basic information and the stay permitted time are the same as those of the visitor information stored in the visitor registration unit 1124. However, like the stay permitted time, the scheduled date and time, the visiting destination, and the basic information are information transmitted to the image forming apparatus 10 by the resident of the dwelling unit 80 at the visiting destination operating the intercom 82, the PC 84, or the smart terminal 85 at a point in time before the visit of the visitor.

The onetime password is a unique password generated by the processor 111. If registering, as the record of the prior registration information, the scheduled date and time, the visiting destination, the basic information, and the stay permitted time transmitted from the resident in the prior registration unit 1125, the processor 111 automatically generates the onetime password and adds the onetime password to the record. The onetime password may be a random numerical value having any number of digits. Alternatively, the random numerical value and at least one of the scheduled date and time, the visiting destination, the basic information, and the stay permitted time may be combined or a processed value based on the scheduled date and time, the visiting destination, the basic information, and the stay permitted time may be used.

The processor 111 can transmit, with the communication device 19, by electronic mail or the like, the onetime password to a transmission destination designated by the resident. The onetime password to be transmitted may be a numerical value or may be image information converted into a code image of a one-dimensional code, a two-dimensional code, or the like. If the visitor actually visits, the visitor inputs the numerical value of the onetime password with the user interface 13 of the image forming apparatus 10 or causes the camera 18 to capture a code image of the onetime password. In response to the input of the numerical value or the capturing of the code image, the processor 111 checks the record of the prior registration information stored in the prior registration unit 1125 and, if the onetime password is registered, adds content of the record of the prior registration information to the record of the visitor information to the visitor registration unit 1124. Consequently, it is possible to reduce time for an input by the visitor and quickly issue an RFID medium.

FIG. 6 is a diagram for explaining an item example of RFID writing information stored in an RFID of an RFID medium issued by the image forming apparatus 10. The RFID writing information includes a visitor ID, a visiting destination, basic information, a visiting time, and a stay permitted time. As the visitor ID, the visiting destination, the basic information, and the stay permitted time, content of a visitor information record about a relevant visitor stored in the visitor registration unit 1124 is transferred. The visiting time is an issue time of the RFID medium and is the present date and time clocked by the timepiece 16.

The residents of the dwelling units 80 need to carry RFID media outside the dwelling units 80. Since it is unnecessary to issue the RFID media of the residents every time, for example, the RFID media can be provided in, for example, a form of a card key. RFID media for residents who are not good at carrying the RFID media such as children and aged people may be provided in a form of a wristband. As the RFID writing information of the RFID media for the residents, for example, the visitor ID can be a resident ID, the visiting destination can be a dwelling unit ID, and the basic information can be a resident. As explained below, in this embodiment, since the visiting time and the stay permitted time are not used for the residents, the visiting time and the stay permitted time may be any values or blanks. Similarly, since the visiting destination and the basic information are not used either in this embodiment, the visiting destination and the basic information may be any values or blanks.

FIG. 7 is a flowchart for explaining an example of a main operation of the image forming apparatus 10. If being started by turning on the image forming apparatus 10, the processor 111 of the image forming apparatus 10 executes the operation illustrated in the flowchart according to a program stored in the program storing unit 1121.

First, the processor 111 of the image forming apparatus 10 determines whether a visitor is present (ACT 1). For example, the processor 111 can determine whether a visitor is present according to whether the user interface 13 is operated. The processor 111 may determine presence or absence of a visitor based on an image captured by the camera 18. Alternatively, the processor 111 may detect, by the detector, approach of a person with a sensor such as a human sensor and determine presence or absence of a visitor. If determining that a visitor is absent (NO in ACT 1), the processor 111 determines whether RFID information is received (ACT 2). By determining presence or absence of reception by the network interface 12 of RFID information transmitted from the RFID reader 50 or the RFID gate 20 through the network 70, the processor 111 can determine whether RFID information is received. The RFID information is RFID writing information read from an RFID medium by the RFID reader 50 or the RFID gate 20. If determining that RFID information is not received (NO In ACT 2), the processor 111 determines whether a registration instruction is received (ACT 3). By determining presence or absence of reception by the network interface 12 of a registration instruction transmitted from the dwelling unit 80 through the network 70, the processor 111 can determine whether the registration instruction is received. The registration instruction is an instruction corresponding to resident operation of the network interface 81 from the intercom 82, the RFID writer 83, the PC 84, or the smart terminal 85 of the dwelling unit 80. If determining that the registration instruction is not received (NO in ACT 3), the processor 111 determines whether an expired prior registration is present (ACT 4). The processor 111 can determine whether an expired prior registration is present by checking a scheduled date and time in the record of the prior registration information stored in the prior registration unit 1125 of the memory 112 and determining whether a predetermined time, for example, six hours elapsed from the scheduled date and time to the present date and time. If determining that an expired prior registration is absent (NO in ACT 4), the processor 111 shifts to the processing in ACT 1 explained above. In this way, the processor 111 waits for some event to occur.

If determining that a visitor is present (YES in ACT 1), the processor 111 executes visitor processing (ACT 5). In the visitor processing, as explained in detail below, the processor 111 informs the visit of the visitor to the dwelling unit 80 at a visiting destination, receives permission from the visiting destination, and issues an RFID medium. The processor 111 shifts to the processing in ACT 1 explained above.

If determining that RFID information is received (YES in ACT 2), the processor 111 executes RFID processing (ACT 6). In the RFID processing, as explained in detail below, the processor 111 unlocks the auto-lock door 40 for the visitor or the resident based on the received RFID information. If the visitor deviates from a moving route to the visiting destination or the stay permitted time elapsed, the processor 111, through an alarm circuitry therein, warns the visitor and transmits an alarm or alarm signal to the dwelling units 80 and the administrator based on the received RFID information. If the visitor is about to enter an off-limit position, based on the received RFID information, the processor 111 warns the resident and transmits an alarm to the administrator and transmits a warning to a contact set by a family member of the resident. The processor 111 shifts to the processing in ACT 1 explained above.

If determining that the registration instruction is received (YES in ACT 3), the processor 111 executes registration processing (ACT 7). In the registration processing, as explained in detail below, the processor 111 registers prior registration information in the prior registration unit 1125 and updates the registration information in the visitor registration unit 1124 and the like. The processor 111 shifts to the processing in ACT 1 explained above.

If determining that expired prior registration is present (YES in ACT 4), the processor 111 deletes the relevant prior registration (ACT 8). For example, the processor 111 deletes a record of prior registration information determined as expired among records of the prior registration information stored in the prior registration unit 1125. This processing is processing for deleting a record of prior registration information remaining without being deleted in the prior registration unit 1125 because a visitor registered beforehand does not visit. The processor 111 shifts to the processing in ACT 1 explained above.

Figure 8:
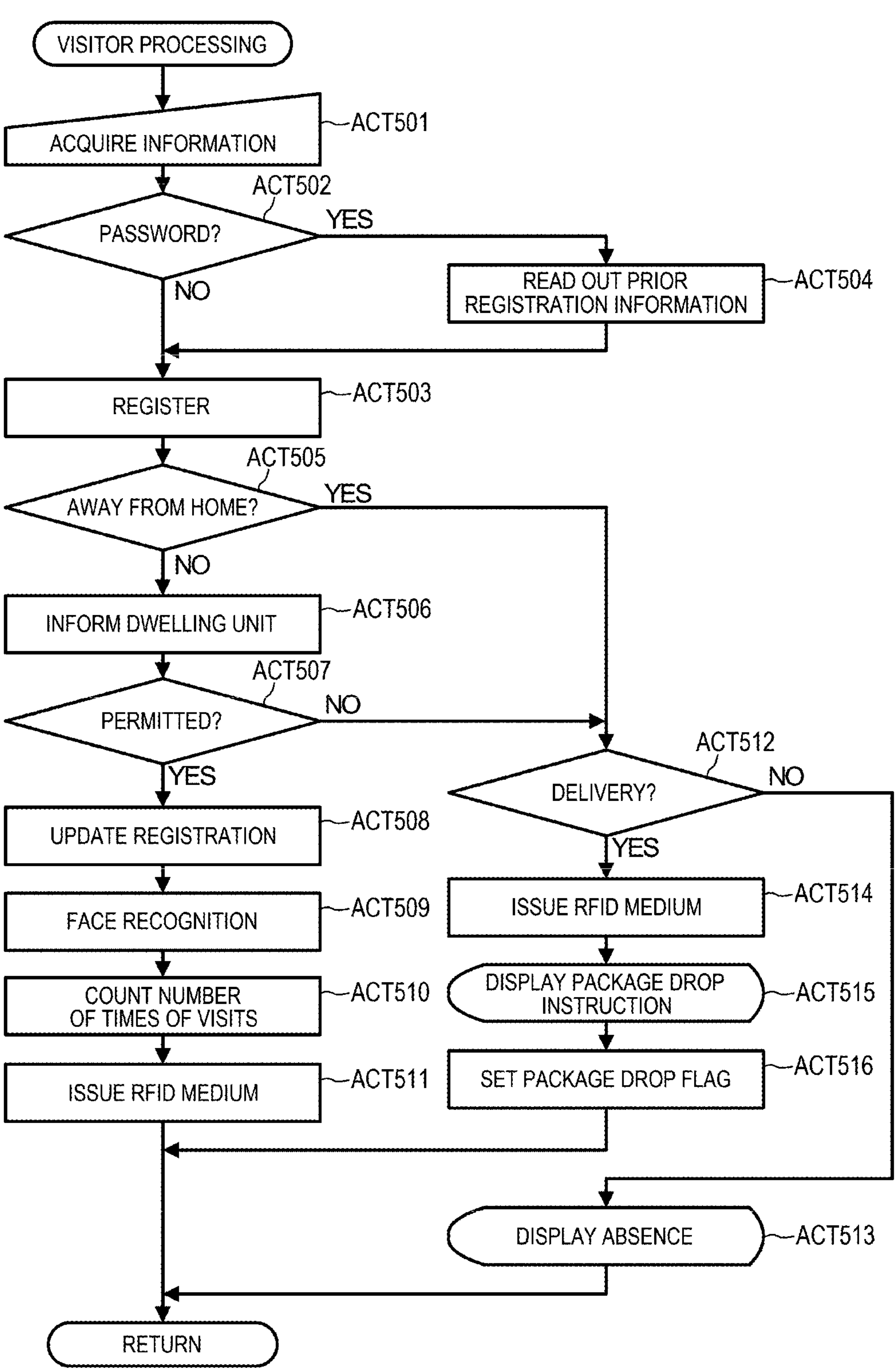
FIG. 8 is a flowchart for explaining an example of the operation of visitor processing in FIG. 7.

FIG. 8 is a flowchart for explaining an example of the operation of the visitor processing in ACT 5 explained above.

If determining in ACT 1 that a visitor is present, the processor 111 acquires information (ACT 501). Specifically, the processor 111 acquires a visiting destination and basic information, which are input information input by the visitor by operating the user interface 13, serving as visitor information, and a face image of the visitor captured by the camera 18 and causes the temporary storage unit 1126 of the memory 112 to store the acquired information. The input information is sometimes a onetime password input by the visitor by operating the user interface 13. If the camera 18 captures a code image, the processor 111 is capable of decoding the code image and acquiring an original onetime password.

The processor 111 determines whether the information stored in the temporary storage unit 1126 is a onetime password (ACT 502).

If determining that the information stored in the temporary storage unit 1126 is not a onetime password (NO in ACT 502), the processor 111 registers, in the visitor registration unit 1124, the information stored in the temporary storage unit 1126 (ACT 503). For example, the processor 111 creates, in the visitor registration unit 1124, a record of visitor information to which a new visitor ID is allocated and registers, in the created record, the visiting destination and the basic information and the face image stored in the temporary storage unit 1126. A stay permitted time is not registered yet. If the registration in the visitor registration unit 1124 is completed, the processor 111 can delete the information stored in the temporary storage unit 1126.

If determining that the information stored in the temporary storage unit 1126 is a onetime password (YES in ACT 502), the processor 111 reads out prior registration information corresponding to the onetime password from the prior registration unit 1125 and causes the temporary storage unit 1126 to store the prior registration information (ACT 504). For example, the processor 111 searches through records of the prior registration information stored in the prior registration unit 1125 using, as a search key, the onetime password stored in the temporary storage unit 1126. The processor 111 reads out the visiting destination, the basic information, and the stay permitted time from a record of the prior registration information in which a matching onetime password is registered and causes the temporary storage unit 1126 to store the visiting destination, the basic information, and the stay permitted time. At this time, the processor 111 may compare a scheduled date and time of the record with the present date and time clocked by the timepiece 16 and, if the scheduled date and time is different by a predetermined time, for example, one hour or more, invalidate the prior registration information. In this case, the processor 111 desirably informs, with the display of the user interface 13 or the speaker 17, that the visitor should input information with operation of the user interface 13.

If reading out the prior registration information corresponding to the onetime password, the processor 111 proceeds to the processing in ACT 503 explained above and registers, in the visitor registration unit 1124, the information stored in the temporary storage unit 1126 (ACT 503). For example, the processor 111 creates, in the visitor registration unit 1124, a record of visitor information to which a new visitor ID is allocated and registers, in the record, the visiting destination, the basic information, the stay permitted time, and the face image in the prior registration information stored in the temporary storage unit 1126. Since the prior registration information includes the stay permitted time, the stay permitted time can be registered.

After completing the registration in the visitor registration unit 1124, the processor 111 determines whether the resident of the dwelling unit 80 at the visiting destination is away from home (ACT 505). For example, the processor 111 checks, from the dwelling unit database 1123, absence scheduled periods and absence pretense settings about all records of dwelling unit information having a dwelling unit ID of the dwelling unit 80, that is, about records of all residents having the dwelling unit ID. The processor 111 can determine that a resident having an absence scheduled period including the present date and time clocked by the timepiece 16 is away from home. If the present visitor is included in visitors for whom the resident pretends to be absent in the absence presence setting, the processor 111 determines that the resident is away from home. According to whether at least one resident determined as not being away from home is present in the dwelling unit 80 at the visiting destination, the processor 111 can determine whether the resident of the dwelling unit 80 at the visiting destination is away from home.

If determining that the resident of the dwelling unit 80 at the visiting destination is not away from home (NO in ACT 505), the processor 111 informs the dwelling unit 80 at the visiting destination that the visitor is present (ACT 506). For example, the processor 111 transmits, with the network interface 12, a call signal to the intercom 82 of the dwelling unit 80 through the network 70. The intercom 82 of the dwelling unit 80, which receives the call signal via the network interface 81, emits call sound from the speaker. The intercom 82 transmits, according to predetermined confirmation operation of the operation member by the resident, a confirmation signal from the network interface 81 to the image forming apparatus 10 through the network 70. In response to reception of the confirmation signal by the network interface 12, the processor 111 of the image forming apparatus 10 transmits, with the network interface 12, a video signal that should be displayed on the display of the intercom 82 to the dwelling unit 80 through the network 70. At this time, the processor 111 may perform image processing for superimposing, on an image captured by the camera 18, text based on the basic information registered in the visitor registration unit 1124. The intercom 82 of the dwelling unit 80, which receives the video signal via the network interface 81, displays an image corresponding to the video signal on the display. Consequently, the resident can check the visitor. If accepting the visitor, the resident inputs a stay permitted time with the operation member of the intercom 82. If not accepting the visitor, the resident inputs non-permission with the operation member of the intercom 82. The intercom 82 transmits a determination signal indicating the input stay permitted time or the non-permission from the network interface 81 to the image forming apparatus 10 through the network 70.

The processor 111 determines, based on the determination signal received by the network interface 12, whether the visit of the visitor is permitted (ACT 507). For example, the processor 111 can determine, according to whether the determination signal includes the stay permitted time, whether the visit is permitted.

If determining that the visit is permitted (YES in ACT 507), the processor 111 updates registration content of the visitor registration unit 1124 (ACT 508). For example, the processor 111 registers the stay permitted time transmitted as the determination signal in a stay permitted time in a record of visitor information about the visitor that is unregistered in the processing in ACT 506 explained above.

The processor 111 recognizes a face of the visitor (ACT 509). For example, the processor 111 extracts, with a well-known method, a feature value of the face of the visitor from a face image in the record of the visitor information of the visitor registration unit 1124 about the visitor or a face image of the visitor acquired by the camera 18.

The face image in the record of the visitor information of the visitor registration unit 1124 is registered at the registration time in ACT 503. However, the face image used for the face recognition may be registered at the face recognition time in ACT 509.

The processor 111 counts, based on the recognized face, the number of times the visitor visited the apartment house in the past (ACT 510). For example, the processor 111 can search for, using the feature value of the face extracted in ACT 509 as a search key, the face image in a record of visitor information in the past registered in the visitor registration unit 1124 and acquire the number of hits as the number of times of visits.

The processor 111 issues an RFID medium based on content of the record of the visitor information about the visitor in the visitor registration unit 1124 (ACT 511). For example, the processor 111 controls the RFID reader writer 15 to write, in an RFID of the RFID medium, a visitor ID, a visiting destination, basic information, a visiting time, and a stay permitted time as RFID writing information. The processor 111 controls the image forming unit 14 to form, on the surface of the RFID medium, an image capable of distinguishing content of the basic information with a color or a pattern. Characters of an attribute, a name, and the like, a logo image of a company to which the visitor belongs, and the like are formed on the surface of the RFID medium, for example, in blue if a job type of the visitor is sales or in pink if the job type of the visitor is delivery. Further, the processor 111 may control the image forming unit 14 to form, based on the counted number of times of visits, an image representing the number of times of visits on the surface of the RFID medium. For example, an image of star marks or lines corresponding to the number of times of visits is formed on the surface of the RFID medium. The image of the star marks or the lines can also be formed in a color based on the content of the basic information. If the number of visitors in the basic information is plural, the processor 111 issues RFID media for the number of visitors. The processor 111 ends the operation of the visitor processing in ACT 5 and shifts to the processing in ACT 1 explained above.

On the other hand, if determining that the resident of the dwelling unit 80 at the visiting destination is away from home (YES in ACT 505) or if the visit is determined as not permitted (NO in ACT 507), the processor 111 determines whether the visitor is a deliverer (ACT 512). For example, the processor 111 can determine whether the visitor is a deliverer according to an attribute in the basic information in the record of the visitor information of the visitor registration unit 1124 about the visitor.

If determining that the visitor is not a deliverer (NO in ACT 512), the processor 111 causes the display of the user interface 13 to display absence of the resident of the dwelling unit 80 at the visiting destination (ACT 513). The processor 111 ends the operation of the visitor processing in ACT 5 and shifts to the processing in ACT 1 explained above.

In contrast, if determining that the visitor is a deliverer (YES in ACT 512), the processor 111 issues an RFID medium based on content of the record of the visitor information about the visitor in the visitor registration unit 1124 (ACT 514). For example, the processor 111 controls the RFID reader writer 15 to write, in an RFID of the RFID medium, a visitor ID, a visiting destination, basic information, a visiting time, and a stay permitted time as RFID writing information. If determining in the processing in ACT 505 that the resident of the dwelling unit 80 at the visiting destination is away from home, the processor 111 can discriminate an absence scheduled period. Accordingly, the processor 111 determines a stay permitted time such as the absence scheduled period+1 hour, for example, based on the absence scheduled period. If a plurality of residents are present in the dwelling unit 80, the processor 111 may determine the stay permitted time based on the shortest absence scheduled period or vice versa the longest absence scheduled period among absence scheduled periods. The processor 111 controls the image forming unit 14 to form, on the surface of the RFID medium, an image capable of allowing distinguishing of content of the basic information with a color or a pattern. In this case, since the job type of the visitor is delivery, an image indicating the visiting destination is formed on the surface of the RFID medium, for example, in pink.

The processor 111 causes the display of the user interface 13 to display a package drop instruction (ACT 515). The package drop instruction is, for example, a message for sticking the issued RFID medium to a package to urge the visitor to place the package in a predetermined package drop position such as a delivery box. At this time, the processor 111 may not only display the package drop instruction but also emit the package drop instruction as a voice message with the speaker 17. The processor 111 may cause the display to display a map indicating the package drop position.

The processor 111 sets a package drop flag about all records of dwelling unit information having the dwelling unit ID of the dwelling unit 80 in the dwelling unit database 1123, that is, about records of all residents having the dwelling unit ID (ACT 516). The processor 111 ends the operation of the visitor processing in ACT 5 and shifts to the processing in ACT 1 explained above.

An RFID medium for the visitor and an RFID medium for the package drop may be portable media of different forms. For example, the RFID medium for the visitor is a wristband and the RFID medium for the package drop is a sticker.

Conversely, the RFID medium for the visitor and the RFID medium for the package drop may be portable media of the same sticker form. In this case, if the image forming apparatus 10 discharges a wristband together with the RFID medium at an RFID medium issue time, the visitor can stick the RFID medium to the wristband and use the RFID medium.

Figure 9:
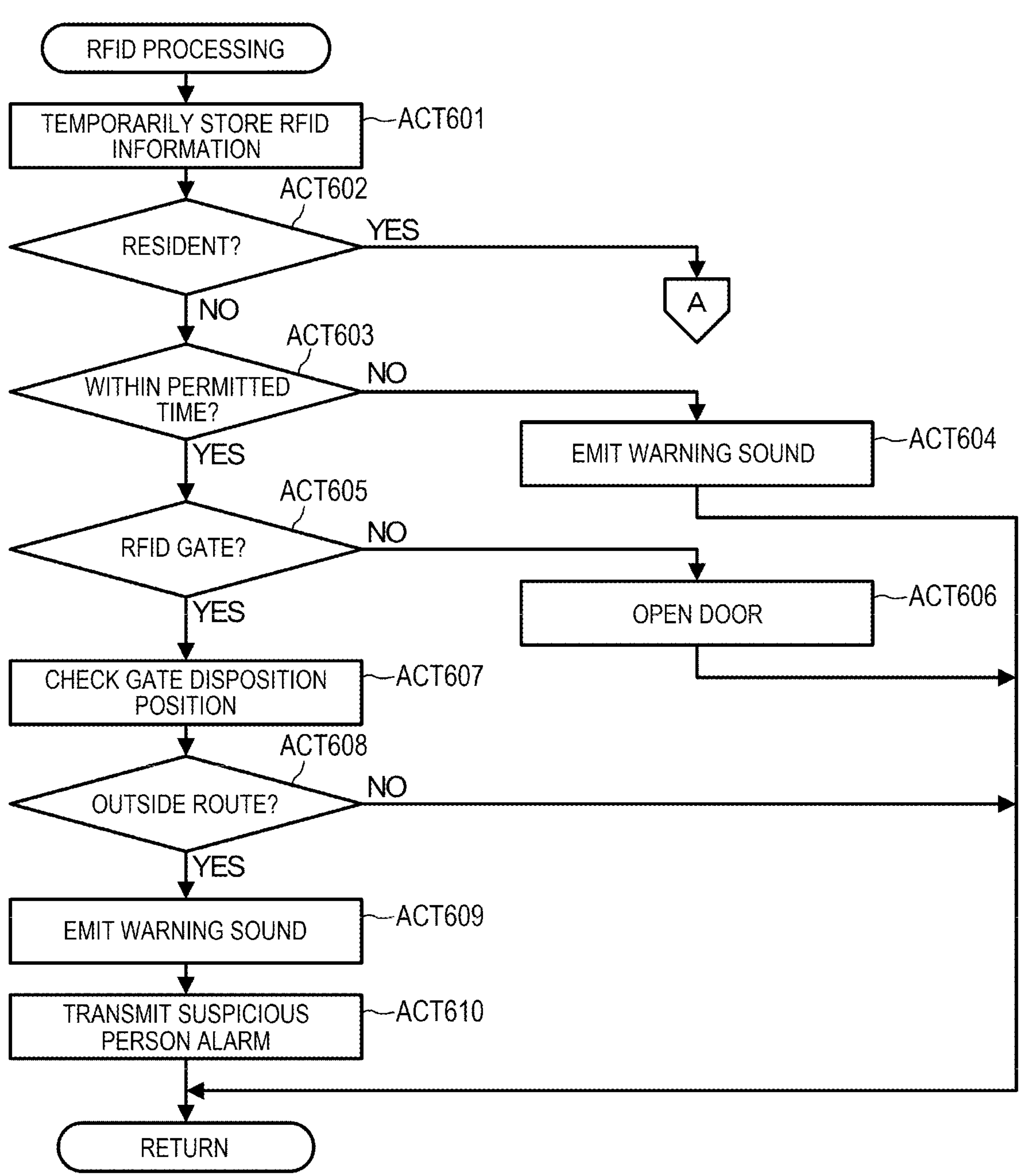
FIG. 9 is a flowchart for explaining an example of the operation of RFID processing in FIG. 7.
Figure 10:
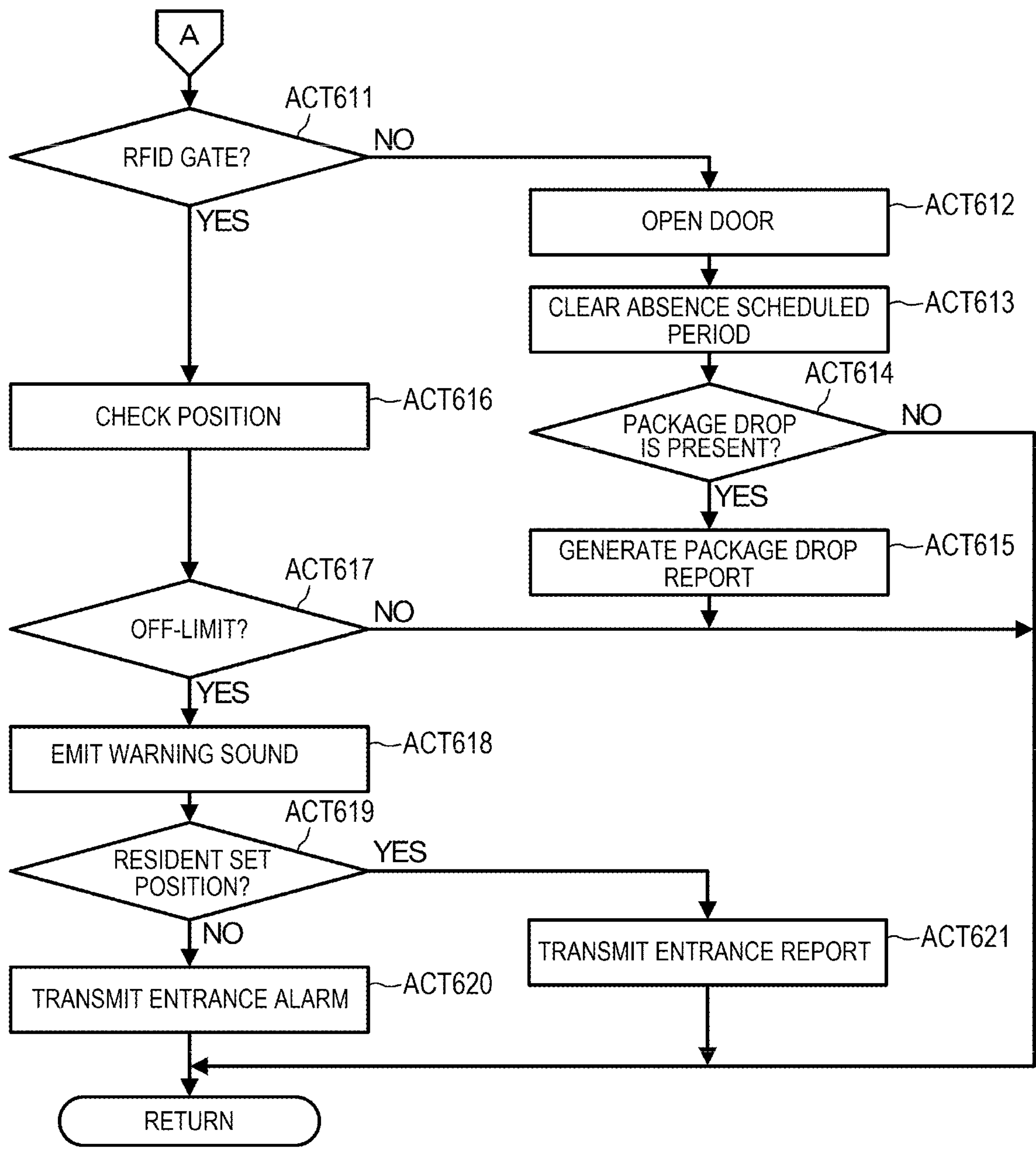
FIG. 10 is a flowchart for explaining the example of the operation of the RFID processing in FIG. 7.

FIGS. 9 and 10 are flowcharts for explaining an example of the operation of the RFID processing in ACT 6 explained above.

If determining in ACT 2 that RFID information is received, the processor 111 causes the temporary storage unit 1126 to temporarily store the received RFID information together with transmission source information for specifying a transmission source of the RFID information (ACT 601). The RFID information is RFID writing information read from the RFID medium by the RFID reader 50 or the RFID gate 20. The transmission source information can be reader and gate IDs capable of uniquely identifying the RFID reader 50 and the RFID gates 20.

The processor 111 determines whether a person carrying the RFID medium, from which the RFID information is read, is a resident (ACT 602). For example, the processor 111 can determine whether the RFID medium carrier is a resident by determining whether the visitor ID in the RFID information stored in the temporary storage unit 1126 is a resident ID.

If determining that the RFID medium carrier is not a resident, that is, is a visitor (NO in ACT 602), the processor 111 determines whether it is still within a stay permitted time permitted for the visitor (ACT 603). For example, the processor 111 can determine whether it is within the stay permitted time by comparing the stay permitted time in the RFID information stored in the temporary storage unit 1126 with the present date and time clocked by the timepiece 16.

If determining that it is not within the stay permitted time (NO in ACT 603), the processor 111 emits warning sound to the visitor (ACT 604). For example, the processor 111 discriminates a transmission source of the RFID information based on reader and gate IDs, which are transmission source information, stored in the temporary storage unit 1126. If the transmission source is the RFID reader 50, the processor 111 transmits, with the network interface 12, an audio signal of the warning sound to the speaker 60 through the network 70 and causes the speaker 60 to emit the warning sound. If the transmission source is the RFID gate 20, the processor 111 transmits, with the network interface 12, the audio signal of the warning sound to the relevant RFID gate 20 through the network 70. The RFID gate 20, which receives the audio signal with the network interface 21, emits the warning sound with the speaker 23. The processor 111 ends the operation of the RFID processing in ACT 6 and shifts to the processing in ACT 1 explained above.

If determining that it is within the stay permitted time (YES in ACT 603), the processor 111 determines whether the transmission source of the RFID information is the RFID gate 20 (ACT 605).

If determining that the transmission source is not the RFID gate 20, that is, is the RFID reader 50 (NO in ACT 605), the processor 111 opens the auto-lock door 40 (ACT 606). For example, the processor 111 controls, with the network interface 12, the auto-lock door 40 through the network 70 to unlock and open the auto-lock door 40. If the auto-lock door 40 is not an automatic door, the processor 111 only unlocks the auto-lock door 40. Consequently, the visitor can proceed from the entrance hall to a passageway to the dwelling unit 80 at the visiting destination. A deliverer who delivers a package to an absent home and receives a package drop instruction such as "Please stuck an issued medium to a package and store the package in a delivery box inside the door" in ACT 515 can also pass through the auto-lock door 40 and place the package in the predetermined package drop position. The processor 111 ends the operation of the RFID processing in ACT 6 and shifts to the processing in ACT 1 explained above.

If determining that the transmission source is the RFID gate 20 (YES in ACT 605), the processor 111 acquires disposition positions of the RFID gates 20 present between the entrance hall and the position of the dwelling unit 80 at the visiting destination (ACT 607). For example, the processor 111 acquires, based on the map information stored in the map storing unit 1122, the position of the dwelling unit 80 having the dwelling unit ID, which is the visiting destination, in the RFID information stored in the temporary storage unit 1126 and acquires gate IDs of the RFID gates 20 disposed between the entrance hall and the position of the dwelling unit 80.

The processor 111 determines whether the visitor deviates from a route to the visiting destination (ACT 608). For example, the processor 111 can determine whether the visitor deviates from the route to the visiting destination by determining whether a gate ID of the RFID gate 20 at the transmission source stored in the temporary storage unit 1126 is included in gate IDs acquired in ACT 607. If determining that the visitor does not deviate from the route (NO in ACT 608), the processor 111 ends the operation of the RFID processing in ACT 6 and shifts to the processing in ACT 1 explained above.

If determining that the visitor deviates from the route (YES in ACT 608), the processor 111 emits warning sound to the visitor (ACT 609). For example, the processor 111 transmits, with the network interface 12, an audio signal of the warning sound to the RFID gate 20 at the transmission source through the network 70. The RFID gate 20, which receives the audio signal with the network interface 21, emits the warning sound with the speaker 23.

The processor 111 transmits a suspicious person alarm to the dwelling units 80 and/or the administrator (ACT 610). For example, the processor 111 transmits, with the network interface 12, through the network 70, an audio signal of predetermined suspicious person alarm sound to the intercoms 82 of the dwelling units 80 or the intercom 82 of the dwelling unit 80 set as the control room of the administrator. The intercom 82 of the dwelling unit 80, which receives the audio signal via the network interface 81, emits the suspicious person alarm sound from the speaker. The processor 111 may transmit, with the communication device 19, the suspicious person alarm to electronic mail addresses or the like set in advance as contacts of the residents or a contact of the administrator. The processor 111 ends the operation of the RFID processing in ACT 6 and shifts to the processing in ACT 1 explained above.

On the other hand, if determining that the RFID media carrier is a resident (YES in ACT 602), the processor 111 determines whether the transmission source of the RFID information is the RFID gate 20 (ACT 611).

If determining that the transmission source is not the RFID gate 20, that is, is the RFID reader 50 (NO in ACT 611), the processor 111 opens the auto-lock door 40 (ACT 612).

The processor 111 clears an absence scheduled period registered in a dwelling unit information record of the resident in the dwelling unit database 1123 (ACT 613). For example, the processor 111 clears an absence scheduled period of a record of dwelling unit information corresponding to a resident ID, which is set as the visitor ID in the RFID information stored in the temporary storage unit 1126, registered in the dwelling unit database 1123.

The processor 111 determines whether a package drop for the resident is present (ACT 614). For example, the processor 111 can determine whether a package drop is present by determining whether a package drop flag of a record of relevant dwelling unit information in the dwelling unit database 1123 is set. If determining that a package drop is absent (NO in ACT 614), the processor 111 ends the operation of the RFID processing in ACT 6 and shifts to the processing in ACT 1 explained above.

If determining that a package drop is present (YES in ACT 614), the processor 111 generates a package drop report for reporting that the package drop of the delivered package is present (ACT 615). For example, the processor 111 transmits, with the network interface 12, an audio signal indicating message voice indicating that the package drop is present to the speaker 60 through the network 70 and causes the speaker 60 to emit the message voice. Consequently, the resident returning home can learn the presence of the package drop and take back the package. The processor 111 ends the operation of the RFID processing in ACT 6 and shifts to the processing in ACT 1 explained above.

If determining that the transmission source is the RFID gate 20 (YES in ACT 611), the processor 111 checks the position of the RFID gate 20 at the transmission source (ACT 616). For example, the processor 111 checks a disposition position in the map information stored in the map storing unit 1122 of the RFID gate 20 indicated by a gate ID of the RFID gate 20 at the transmission source stored in the temporary storage unit 1126.

The processor 111 determines whether the checked position is an off-limit position (ACT 617). For example, the processor 111 can determine whether the checked position is an off-limit position by determining whether the checked position is registered as an off-limit position of a record of relevant dwelling unit information in the dwelling unit database 1123. If determining that the checked position is not an off-limit position (NO in ACT 617), the processor 111 ends the operation of the RFID processing in ACT 6 and shifts to the processing in ACT 1 explained above.

If determining that the checked position is an off-limit position (YES in ACT 617), the processor 111 emits warning sound to the resident (ACT 618). For example, the processor 111 transmits, with the network interface 12, an audio signal of the warning sound to the RFID gate 20 at the transmission source through the network 70. The RFID gate 20, which receives the audio signal with the network interface 21, emits warning sound with the speaker 23.

The processor 111 determines whether the off-limit position is a position set by the resident (ACT 619).

If determining that the off-limit position is not a position set by the resident, that is, is a position set by the administrator (NO in ACT 619), the processor 111 transmits, to the administrator, an entrance alarm indicating that the resident entered the off-limit position (ACT 620). For example, the processor 111 transmits, with the network interface 12, through the network 70, an audio signal of predetermined entrance alarm sound to the intercom 82 of the dwelling unit 80 set as the control room of the administrator. The intercom 82 of the dwelling unit 80, which receives the audio signal via the network interface 81, emits warning sound from the speaker. The processor 111 may transmit, with the communication device 19, an entrance alarm to the electronic mail address or the like set in advance as the contact of the administrator. The processor 111 ends the operation of the RFID processing in ACT 6 and shifts to the processing in ACT 1 explained above.

In contrast, if determining that the off-limit position is a position set by the resident (YES in ACT 619), the processor 111 transmits, to the resident in the contact, an entrance report indicating that a family member entered the off-limit position (ACT 621). For example, the processor 111 transmits, with the communication device 19, the entrance report to the electronic mail address or the like set as the contact in advance. The processor 111 ends the operation of the RFID processing in ACT 6 and shifts to the processing in ACT 1 explained above.

Figure 11:
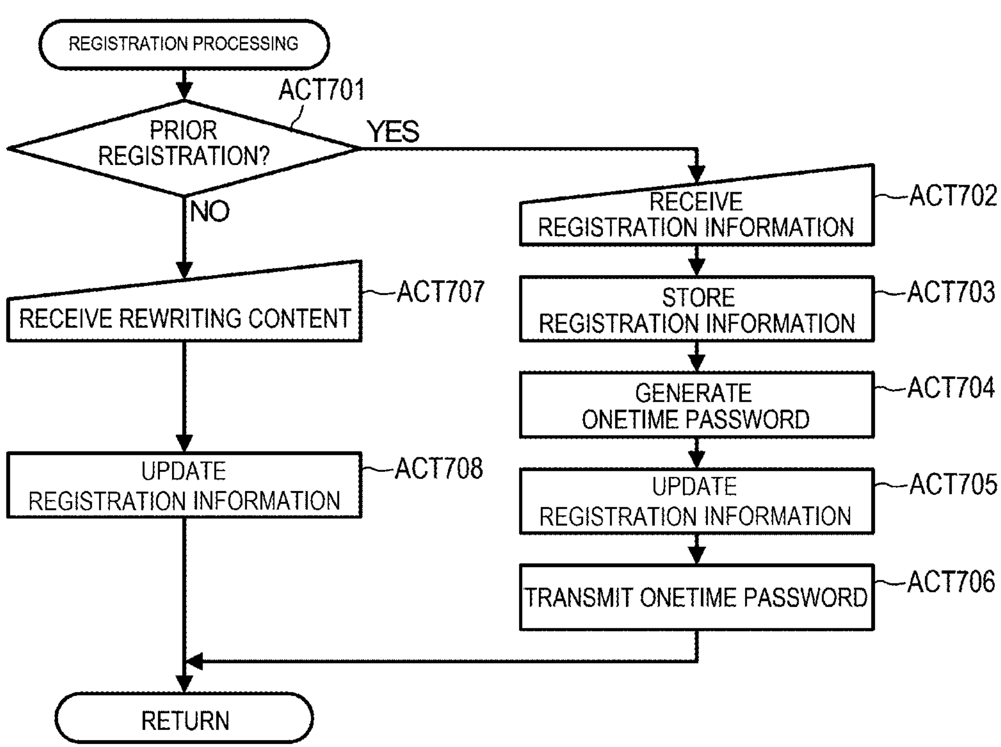
FIG. 11 is a flowchart for explaining an example of the operation of registration processing in FIG. 7.

FIG. 11 is a flowchart for explaining an example of the operation of the registration processing in ACT 7.

If determining in ACT 3 that the registration instruction is received, the processor 111 determines whether the registration instruction is an instruction for prior registration (ACT 701). For example, the processor 111 can determine whether the registration instruction is an instruction for prior registration by determining whether the registration instruction is transmitted from the intercom 82, the PC 84, or the smart terminal 85.

If determining that the registration instruction is an instruction for prior registration (YES in ACT 701), the processor 111 receives prior registration information included in the registration instruction or transmitted following the registration instruction (ACT 702). For example, the processor 111 receives the prior registration information with the network interface 12 and causes the temporary storage unit 1126 to temporarily store the prior registration information. The processor 111 receives, in addition to the prior registration information, a contact such as an electronic mail address of a visit planning person that is transmitted from the intercom 82, the PC 84, or the smart terminal 85 and to which a onetime password should be transmitted and causes the temporary storage unit 1126 to store the contact.

The processor 111 causes the prior registration unit 1125 to store the prior registration information stored in the temporary storage unit 1126 (ACT 703). For example, the processor 111 generates a record of new prior registration information in the prior registration unit 1125 and registers, in the record, the prior registration information stored in the temporary storage unit 1126. At this stage, a onetime password of the record is blank.

Accordingly, the processor 111 generates a onetime password (ACT 704).

The processor 111 updates the registration information based on the generated onetime password (ACT 705). For example, the processor 111 registers the onetime password generated in ACT 704 in the onetime password of the record generated in ACT 703.

The processor 111 transmits the onetime password generated in ACT 704 to the visit planning person (ACT 706). For example, the processor 111 transmits, with the communication device 19, the onetime password to the contact such as the electronic mail address of the visit planning person stored in the temporary storage unit 1126. The processor 111 ends the operation of the registration processing in ACT 7 and shifts to the processing in ACT 1 explained above.

On the other hand, if determining that the registration instruction is not an instruction for prior registration, that is, the registration information is a registration instruction for rewriting content corresponding to content rewriting of the RFID of the RFID medium by the RFID writer 83 (NO in ACT 701), the processor 111 receives the rewriting content included in the registration instruction (ACT 707). For example, the processor 111 receives, with the network interface 12, rewriting content transmitted from the RFID writer 83 and causes the temporary storage unit 1126 to temporarily store the rewriting content. The rewriting content includes rewriting of a stay permitted time written in the RFID of the RFID medium carried by the visitor or clearing of content of an RFID of an RFID medium stuck to a dropped package.

The processor 111 updates the registration information according to the rewriting content stored in the temporary storage unit 1126 (ACT 708). For example, if the rewriting content is content indicating the rewriting of the stay permitted time written in the RFID of the RFID medium carried by the visitor, the processor 111 updates the stay permitted time in the record of the visitor information of the relevant visitor stored in the visitor registration unit 1124 to a rewritten time. At this time, if there are a plurality of visitors, the processor 111 waits for rewriting content for the number of visitors to be transmitted and updates the registration information. If rewriting content for the number of visitors is not transmitted, the processor 111 can transmit a warning to the intercom 82 of the relevant dwelling unit 80 to perform rewriting for the number of visitors. If the rewriting content is content indicating clearing of content of an RFID of an RFID medium stuck to a delivered package, the processor 111 clears and updates the package drop flag in the record of the relevant dwelling unit information of the dwelling unit database 1123. The processor 111 ends the operation of the registration processing in ACT 7 and shifts to the processing in ACT 1 explained above.

Figure 12:
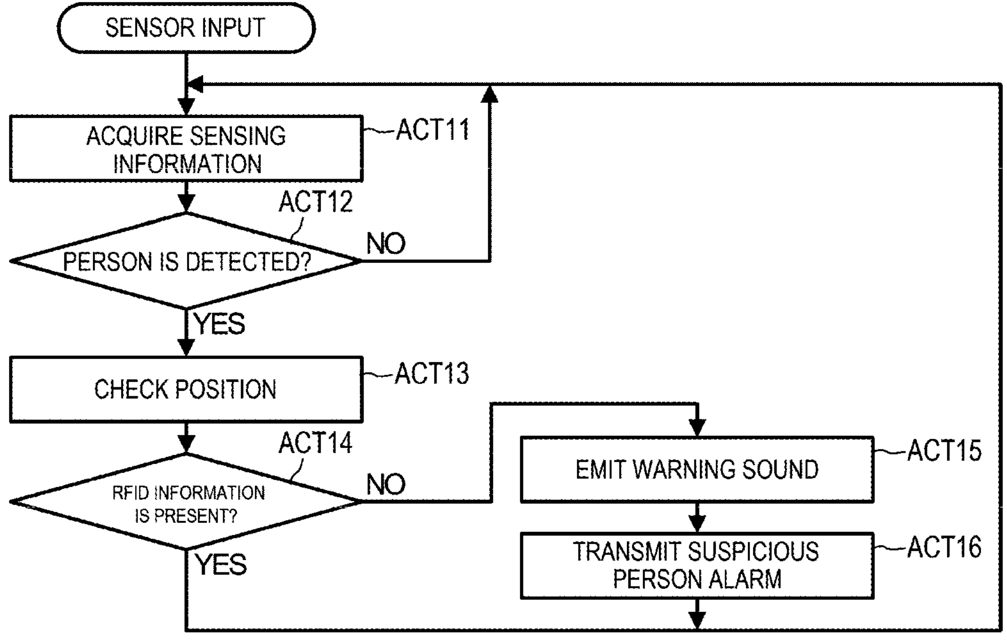
FIG. 12 is a flowchart for explaining an example of a sensor input operation of the image forming apparatus.

FIG. 12 is a flowchart for explaining an example of a sensor input operation executed in parallel to the main operation of the image forming apparatus 10. The operation illustrated in the flowchart corresponds to each of a plurality of sensors 30.

The processor 111 acquires, with the network interface 12, sensing information transmitted from the sensor 30 through the network 70 and stores the sensing information in the temporary storage unit 1126 (ACT 11).

The processor 111 determines, based on the sensing information stored in the temporary storage unit 1126, whether a person is detected by the detector (ACT 12). For example, if the sensor 30 is a human sensor that detects a person passing through the RFID gate 20, the processor 111 can determine, according to the sensing information itself, whether a person is detected. If the sensor 30 is a camera, an imaging range of which is the RFID gate 20, the processor 111 can determine, according to whether a moving body is detected by a well-known moving image detecting method from a camera image, which is the sensing information, whether a person is detected. If the sensor 30 is a thermos-camera, the processor 111 can determine, according to whether a subject having temperature equivalent to the body temperature is detected, whether a person is detected. If determining that a person is not detected (NO in ACT 12), the processor 111 shifts to the processing in ACT 11 explained above.

If determining that a person is detected (YES in ACT 12), the processor 111 checks the position of the sensor 30 (ACT 13).

The processor 111 determines whether RFID information is present in the RFID gate 20 corresponding to the position of the sensor 30 (ACT 14). For example, the processor 111 can determine whether RFID information is present by determining, with ACT 601 of the main operation explained above, whether RFID information from the relevant RFID gate 20 is stored in the temporary storage unit 1126. RFID information is absent if a person not carrying an RFID medium passes through the corresponding RFID gate 20. If determining that RFID information is present (YES in ACT 14), the processor 111 shifts to the processing in ACT 11 explained above.

In contrast, if determining that RFID information is absent (NO in ACT 14), the processor 111 emits warning sound in the relevant RFID gate 20 (ACT 15). For example, the processor 111 transmits, with the network interface 12, an audio signal of the warning sound to the relevant RFID gate 20 through the network 70. The RFID gate 20, which receives the audio signal with the network interface 21, emits the warning sound with the speaker 23.

Further, as in ACT 610 of the main operation explained above, the processor 111 transmits a suspicious person alarm to the dwelling units 80 and/or the administrator (ACT 16). The suspicious person alarm for the visitor whose stay permitted time elapsed and the suspicious person alarm corresponding to the detection of the person not carrying an RFID medium may be suspicious person alarms, contents and transmission destinations of which are distinguished. That is, the person not carrying an RFID medium is more highly likely to be a suspicious person. Accordingly, the suspicious person alarm may be transmitted to not only the administrator but also all residents, the suspicious person alarm may be a suspicious person alarm for emitting an alarm from the speakers 23 of all the RFID gates 20, or the suspicious person alarm may be transmitted to a security company and the police. The processor 111 shifts to the processing in ACT 11 explained above.

A collection box for collecting used RFID media is disposed in the entrance hall of the apartment house. If a visitor finishes business and goes home, the visitor returns an RFID medium to the collection box. A resident returns an RFID medium stuck to a dropped package to the collection box. The administrator or the like may periodically go around the dwelling units 80 and collect RFID media stuck to packages.

The RFID gate 20 may be disposed instead of the RFID reader 50 and the speaker 60. In this case, the determination processing in ACT 605 and ACT 611 only has to be changed to processing for determining whether the RFID gate 20 is the RFID gate 20 disposed near the auto-lock door 40.

As explained above, the image forming apparatus 10 functioning as the security management apparatus according to this embodiment acquires, in an entrance, for example, an entrance hall of a facility including a plurality of visiting destinations like an apartment house such as a condominium, about a visitor to a specific visiting destination such as a specific dwelling unit 80, basic information including at least one of an attribute, relation information, and a visiting purpose and a stay permitted time in the dwelling unit 80 or the like at a visiting destination. The image forming apparatus 10 issues an RFID medium, which is a portable medium that stores the acquired basic information and the acquired stay permitted time and on the surface of which an image capable of distinguishing content of the basic information is recorded. The image forming apparatus 10 receives, from a reading device such as the RFID reader 50 or the RFID gate 20 that is disposed in the facility, for example, the entrance hall and reads the stay permitted time from the portable medium in a noncontact manner, the read stay permitted time and, if the stay permitted time already elapsed, emits warning sound or a message from the speaker 60 or 23 or the like to warn a visitor passing a disposition position of the reading device.

Consequently, even if an intruder attempts to enter the facility using a portable medium issued in the past, a warning is emitted by checking the stay permitted time. Therefore, a psychological suppression effect for the intruder is expected. Further, since the warning is recognized by residents and the like present near the entrance, it is possible to prevent an attempt of intrusion of the intruder in advance. Accordingly, it is possible to improve security in the facility including the plurality of visiting destinations.

Further, in this embodiment, reading devices such as the RFID gates 20 that read a stay permitted time from a portable medium in a noncontact manner are disposed in places other than the entrance hall in the facility as well. The image forming apparatus 10 receives the stay permitted time read in the places in the facility and, if the stay permitted time already elapsed, emits warning sound or a message from the speaker 23 or the like to warn a visitor passing disposition positions of the reading devices.

Accordingly, even if a visitor attempts to visit the dwelling unit 80 or the like other than a visiting destination after finishing business at the visiting destination, the same effects as the effects in the case of the intruder are obtained.

In this embodiment, the image forming apparatus 10 transmits a suspicious person alarm to the residents and the administrator simultaneously with the emission of the warning.

Accordingly, the residents and the administrator can learn intrusion of a suspicious person with the suspicious person alarm. Therefore, it is possible to further improve the security.

In this embodiment, the image forming apparatus 10 receives, with the user interface 13, an input of basic information from a visitor, sends, with the network interface 12, by a query processor, an inquiry to a visiting destination based on the basic information, and receives a stay permitted time from a visiting destination to acquire a designated stay permitted time from the visiting destination.

Accordingly, it is possible to set appropriate stay permitted periods according to businesses of visitors, which are not uniform.

In this embodiment, the image forming apparatus 10 issues an RFID medium capable of always presenting an image capable of distinguishing content of basic information such as a badge, a wristband, or a sticker.

Accordingly, a resident or the like who passes a visitor in the facility can check an image capable of distinguishing content of basic information recorded on the surface of an RFID medium and discriminate an attribute of the visitor. Therefore, it is possible to reduce a fear of feeling anxiety.

In this embodiment, the image forming apparatus 10 receives and stores an absence scheduled period or absence pretense setting from a resident or the like, determines, referring to the absence scheduled period or the absence pretense setting, whether a resident at a visiting destination of a visitor is away from home, and, if the resident at the visiting destination is away from home, notifies absence to the visitor.

Accordingly, the image forming apparatus 10 can notify the absence to the visitor without sending an unnecessary inquiry or an undesired inquiry to the dwelling unit 80 or the like at the visiting destination, that is, without emitting call sound of the intercom 82 of the dwelling unit 80. At this time, the image forming apparatus 10 may cause the visitor to hear the call sound as if an inquiry is sent to the dwelling unit 80.

In this embodiment, if a visitor is a deliverer and a person at a visiting destination is absent, the image forming apparatus 10 issues a portable medium such as an RFID medium and instructs, with the user interface 13 or the like, the deliverer to stick the portable medium to a package to be delivered.

Accordingly, it is possible to cope with package drop of the delivered package.

The image forming apparatus 10 causes a portable medium stuck to a package for package drop to store a stay permitted time based on an absence scheduled period.

Accordingly, the image forming apparatus 10 can cause the portable medium to store a stay permitted time adjusted to an absence period of a resident or the like. Therefore, even if the resident or the like coming home carries a package to the dwelling unit 80, a warning is not emitted.

In this embodiment, the image forming apparatus 10 detects, by the detector, based on sensing information of the sensor 30, a passing person passing disposition positions where the reading devices such as the RFID reader 50 and the RFID gates 20 are disposed and, if the passing person is detected by the detector, emits an alarm to the facility if a stay permitted time is not received from the reading devices.

Accordingly, since the image forming apparatus 10 can find an intruder not carrying a portable medium such as an RFID medium and emit an alarm. Therefore, it is possible to further improve the security.

The portable medium is an RFID medium. The reading device is the RFID gate 20 including the RFID reader 22 that wirelessly reads a stay permitted time stored in the RFID medium and a warning emitting device or warning emitter such as the speaker 23. The image forming apparatus 10 includes the RFID reader writer 15 that writes basic information and the stay permitted time in the RFID medium and the image forming unit 14 that forms an image on the surface of the RFID medium. If the stay permitted time read by the RFID gate 20 elapsed, the image forming apparatus 10 causes the warning emitting device or warning emitter of the RFID gate 20 to emit a warning.

Accordingly, by using the RFID technology, it is possible to reduce a burden of carrying a portable medium on a visitor and achieve security improvement.

In this embodiment, the image forming apparatus 10 grasps a moving position of a visitor and, if the visitor deviates from a moving route to a visiting destination or if the visitor is moving to an off-limit position, warns the visitor and/or emit an alarm.

Accordingly, it is possible to further improve the security.

In this embodiment, the image forming apparatus 10 receives and stores prior registration of basic information and a stay permitted time about a visit planning person from a visiting destination, transmits, with the communication device 19, a onetime password to the visit planning person, if an input of the onetime password is received from the visitor by the user interface 13, issues a portable medium such as an RFID medium using the stored basic information and the stay permitted time registered beforehand.

Accordingly, if a visit of a visiting person is known in advance, by registering the visit beforehand, if the visitor visits, an input of basic information of the visitor can be omitted and an inquiry of a stay permitted time to a resident or the like of the facility is unnecessary.

The security system 1 including the image forming apparatus 10 functioning as the security management apparatus according to this embodiment includes the image forming apparatus 10 disposed in an entrance, for example, an entrance hall of a facility including a plurality of visiting destinations like an apartment house such as a condominium, the RFID writer 83 disposed in each of the visiting destinations, and a reading devices such as the RFID gates 20 discretely disposed in routes from the entrance of the facility to the visiting destinations. The image forming apparatus 10 acquires, about a visitor to a specific visiting destination such as a specific dwelling unit 80, basic information including at least one of an attribute, relation information, and a visiting purpose and a stay permitted time in the dwelling unit 80 or the like at a visiting destination and issues an RFID medium, which is a portable medium that stores the acquired basic information and the acquired stay permitted time. The image forming apparatus 10 receives the stay permitted time read from the portable medium by the reading device and, if the stay permitted time already elapsed, emits warning sound or a message from the speaker 60, 23 or the like to warn a visitor passing a disposition position of the reading device. The rewriting device rewrites the stay permitted time stored in the portable medium.

Consequently, even if an intruder attempts to enter the facility using a portable medium issued in the past, a warning is emitted by checking the stay permitted time. Therefore, a psychological suppression effect for an intruder is expected. Further, since the warning is recognized by residents and the like present near the entrance, it is possible to prevent an attempt of intrusion of the intruder. Accordingly, it is possible to improve security in the facility including the plurality of visiting destinations. If the stay at the visiting destination is extended and the stay permitted time elapsed, the stay permitted time stored in the portable medium is rewritten by the rewriting device at the visiting destination. Consequently, it is possible to prevent the visitor whose staying time is extended from being warned.

Second Embodiment

A second embodiment is explained. The same components and operations as the components and the operations in the first embodiment explained above are denoted by the same reference numerals and signs as the reference numerals and signs in the first embodiment to omit explanation of the components and the operations. Differences from the first embodiment are explained below.

FIG. 13 is a diagram for explaining a configuration example of the security system 1 including a security management apparatus according to the second embodiment. This embodiment is an example in which the image forming apparatus 10 performs only reception of a visitor and an issuing operation for an RFID medium and a management server apparatus 90 performs a security management operation using the issued RFID medium. That is, this embodiment is an example in which the security management apparatus is configured by the image forming apparatus 10 and the management server apparatus 90.

The management server apparatus 90 is connected to the network 70 and is capable of communicating with the image forming apparatus 10, the RFID gates 20, the sensors 30, the auto-lock door 40, the RFID reader 50, the speaker 60, and equipment of the dwelling units 80 through the network 70.

In this embodiment, the image forming apparatus 10 may not include the communication device 19.

Figure 14:
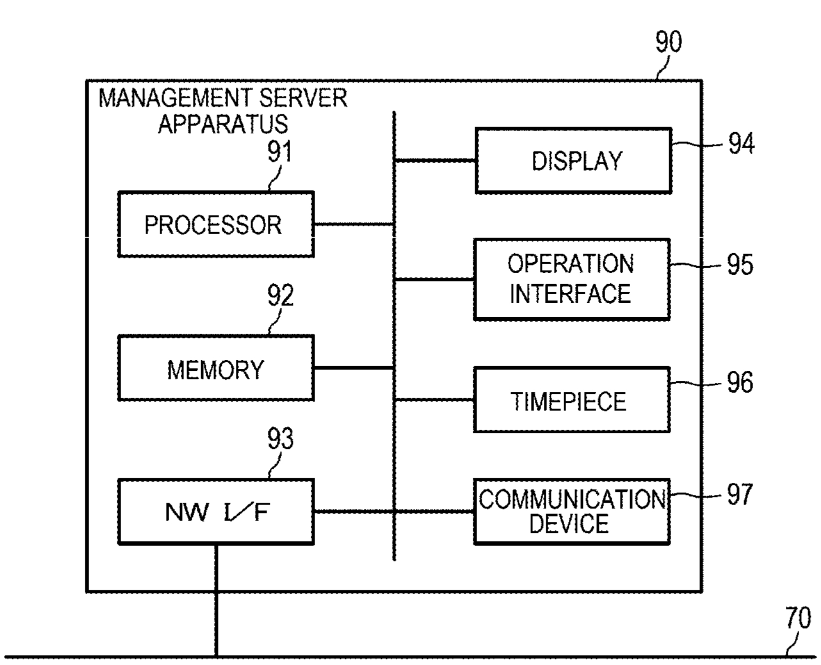
FIG. 14 is a diagram for explaining a configuration example of a management server apparatus, which is a part of the security management apparatus.

FIG. 14 is a diagram for explaining a configuration example of the management server apparatus 90, which is a part of the security management apparatus. The management server apparatus 90 includes a processor 91, a memory 92, a network interface 93, a display 94, an operation interface 95, a timepiece 96, and a communication device or communication processor 97. In FIG. 14, network interface is abbreviated as NW I/F. The processor 91, the memory 92, the network interface 93, the display 94, the operation interface 95, the timepiece 96, and the communication device or communication processor 97 are housed in a not-illustrated housing.

The processor 91 controls the entire image forming apparatus 10.

The processor 91 is an arithmetic element (for example, a CPU) that executes arithmetic processing. The processor 91 performs various kinds of processing based on data such as programs stored in the memory 92. The processor 91 executes the programs stored in the memory 92 to thereby function as a control unit capable of executing various operations.

The memory 92 is a storage device that stores programs, data used in the programs, and the like. The memory 92 temporarily stores data and the like being processed by the processor 91. The memory 92 is configured as a nonvolatile memory and a volatile memory.

The network interface 93 is an interface for communicating with the image forming apparatus 10, the RFID gates 20, the sensors 30, the auto-lock door 40, the RFID reader 50, the speaker 60, and the equipment in the dwelling units 80 via the network 70.

The display 94 displays a screen according to a video signal input from the processor 91.

The operation interface 95 includes various operation members. The operation interface 95 supplies an operation signal corresponding to operation of the operation members to the processor 91. The operation members are, for example, a touch sensor, ten keys, various function keys, and a keyboard. The touch sensor is, for example, a resistive film type touch sensor or a capacitance type touch sensor. The touch sensor acquires information indicating a position designated in a certain region. The touch sensor is configured as a touch panel integrally with the display 94 to thereby input, to the processor 91, a signal indicating a touched position on a screen displayed on the display 94.

The timepiece 96 clocks the present date and time.

The communication device 97 is an interface for communicating with external equipment via a communication network different from the network 70. The communication network includes, for example, the Internet, a public communication network, and a mobile communication network well known to the public.

Figure 15:
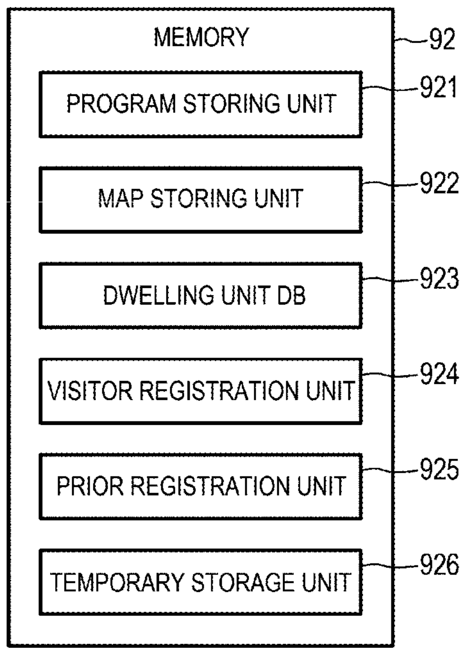
FIG. 15 is a diagram for explaining a configuration example of a memory included in the management server apparatus.

FIG. 15 is a diagram for explaining a configuration example of the memory 92 included in the management server apparatus 90. The memory 92 includes a program storing unit or program storage 921, a map storing unit or map storage 922, a dwelling unit database 923, a visitor registration unit or visitor registrar 924, a prior registration unit or prior registrar 925, and a temporary storage unit or temporary storage 926. In FIG. 15, database is abbreviated as DB. The program storing unit 921, the map storing unit 922, the dwelling unit database 923, the visitor registration unit 924, and the prior registration unit 925 are configured in a nonvolatile memory. The temporary storage unit 926 is configured in a volatile memory. The temporary storage unit 926 is used to temporarily store various data and information generated by the processor 91 halfway in processing.

The program storing unit 921 stores programs for causing the processor 91 to perform the operation of the management server apparatus 90. The programs include a security management program for causing the processor 91 to perform an operation relating to the security management apparatus according to the second embodiment.

The map storing unit 922, the dwelling unit database 923, the visitor registration unit 924, and the prior registration unit 925 are the same as the map storing unit 1122, the dwelling unit database 1123, the visitor registration unit 1124, and the prior registration unit 1125 of the image forming apparatus 10 in the first embodiment.

Figure 16:
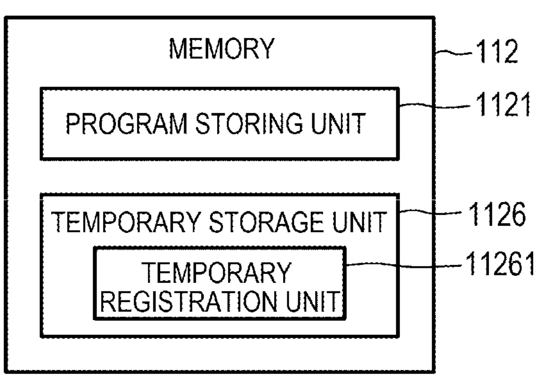
FIG. 16 is a diagram for explaining a configuration example of a memory included in an image forming apparatus, which is a part of the security management apparatus.

Accordingly, in this embodiment, the memory 112 of the image forming apparatus 10 does not include the map storing unit 1122, the dwelling unit database 1123, the visitor registration unit 1124, and the prior registration unit 1125. FIG. 16 is a diagram for explaining a configuration example of the memory 112 of the image forming apparatus 10, which is a part of the security management apparatus. In this embodiment, the memory 112 includes the program storing unit 1121 and the temporary storage unit 1126. The program storing unit 1121 is configured in a nonvolatile memory and the temporary storage unit 1126 is configured in a volatile memory. The temporary storage unit 1126 is used to temporarily store various data and information generated by the processor 111 halfway in processing. For example, the temporary storing unit 1126 includes a temporary registration unit or temporary registrar 11261 that temporarily stores basic information and the like input by the user interface 13.

Figure 17:
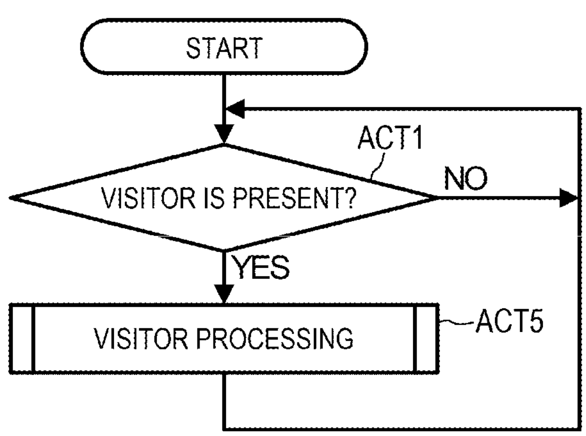
FIG. 17 is a flowchart for explaining an example of the operation of the image forming apparatus.

FIG. 17 is a flowchart for explaining an example of the operation of the image forming apparatus 10. If being started by turning on the image forming apparatus 10, the processor 111 of the image forming apparatus 10 executes the operation illustrated in the flowchart according to a program stored in the program storing unit 1121.

As in the first embodiment, the processor 111 of the image forming apparatus 10 determines whether a visitor is present (ACT 1). If determining that a visitor is absent (NO in ACT 1), in this embodiment, the processor 111 repeats the processing in ACT 1. In this way, the processor 111 waits for a visitor to visit.

If determining that a visitor is present (YES in ACT 1), the processor 111 executes visitor processing (ACT 5). The visitor processing in this embodiment is slightly different from the visitor processing in the first embodiment. Details of the visitor processing are explained below. Thereafter, the processor 111 shifts to the processing in ACT 1 explained above.

Figure 18:
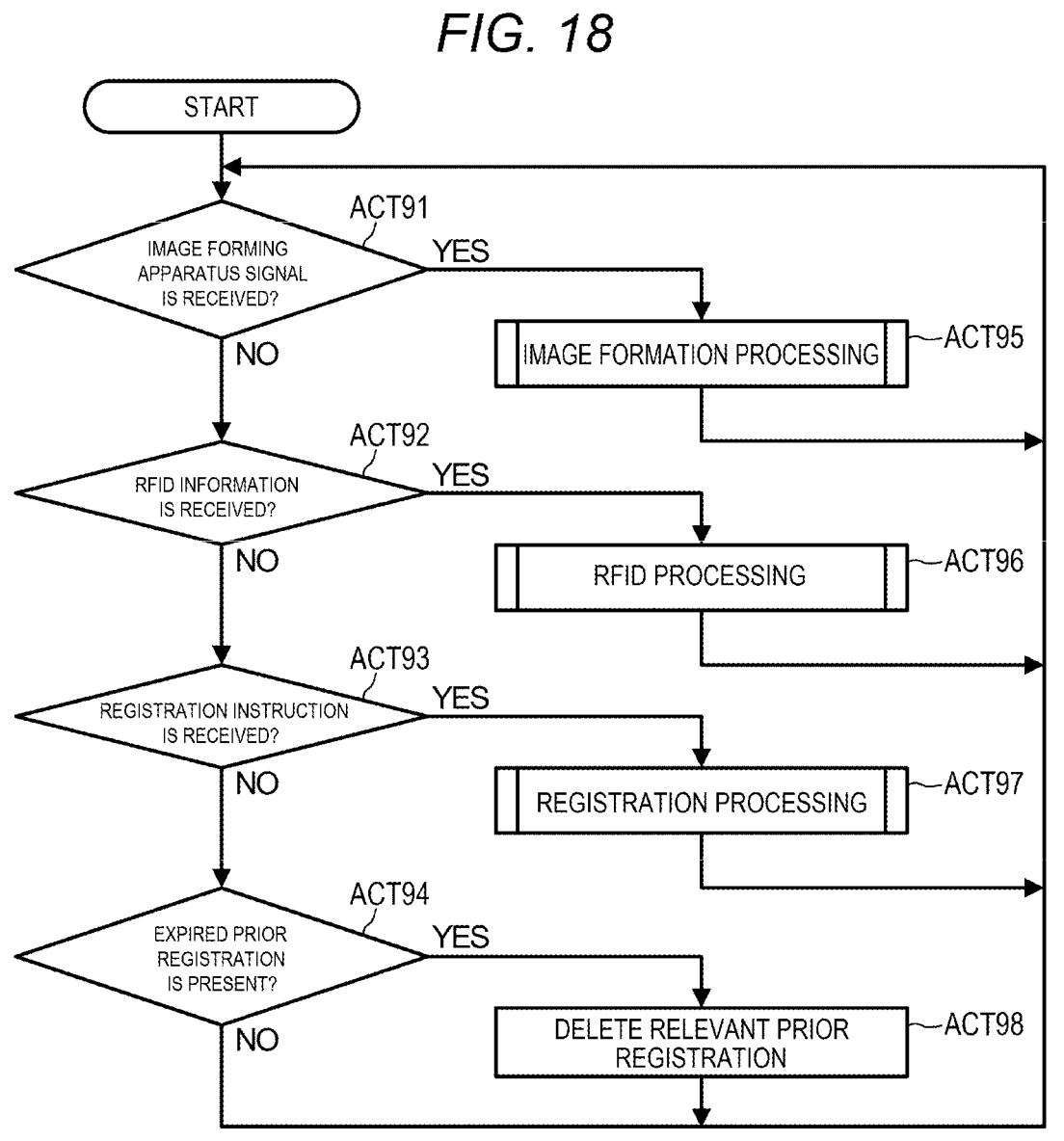

FIG. 18 is a flowchart for explaining an example of a main operation of the management server apparatus 90. If being started by turning on the management server apparatus 90, the processor 91 of the management server apparatus 90 executes the operation illustrated in the flowchart according to a program stored in the program storing unit 921.

First, the processor 91 of the management server apparatus 90 determines whether the network interface 93 receives a signal transmitted from the image forming apparatus 10 through the network 70 (ACT 91). If determining that the signal transmitted from the image forming apparatus 10 is not received (NO in ACT 91), the processor 91 determines whether RFID information is received (ACT 92). The processor 91 can determine whether RFID information is received by determining whether RFID information transmitted from the RFID reader 50 or the RFID gate 20 through the network 70 is received by the network interface 93. The RFID information is RFID writing information read from an RFID medium by the RFID reader 50 or the RFID gate 20. If determining that RFID information is not received (NO in ACT 92), the processor 91 determines whether a registration instruction is received (ACT 93). The processor 91 can determine whether a registration instruction is received by determining whether a registration instruction transmitted from the dwelling unit 80 through the network 70 is received by the network interface 93. The registration instruction is an instruction corresponding to resident operation of the network interface 81 from the intercom 82, the RFID writer 83, the PC 84, or the smart terminal 85 of the dwelling unit 80. If determining that the registration instruction is not received (NO in ACT 93), the processor 91 determines whether an expired prior registration is present (ACT 94). The processor 91 can determine whether an expired prior registration is present by checking a scheduled date and time in a record of prior registration information stored in the prior registration unit 925 of the memory 92 and determining whether a predetermined time, for example, six hours elapsed from the scheduled date and time to the present date and time. If determining that an expired prior registration is absent (NO in ACT 94), the processor 91 shifts to the processing in ACT 91 explained above. In this way, the processor 91 waits for some event to occur.

If determining that a signal transmitted from the image forming apparatus 10 is received (YES in ACT 91), the processor 111 executes image formation processing (ACT 95). In the image formation processing, the processor 91 performs various processing operations corresponding to the received signal from the image forming apparatus 10. Details of the image formation processing are explained below. The processor 91 shifts to the processing in ACT 91 explained above.

If determining that RFID information is received (YES in ACT 92), the processor 91 executes RFID processing (ACT 96). The RFID processing is the same as the RFID processing in ACT 5 in the first embodiment except that an operation entity is the processor 91 and a registration destination of various kinds of information is the memory 92. The processor 91 shifts to the processing in ACT 91 explained above.

If determining that the registration instruction is received (YES in ACT 93), the processor 111 executes registration processing (ACT 97). The registration processing is the same as the registration processing in ACT 7 in the first embodiment except that the operation entity is the processor 91 and the registration destination of various kinds of information is the memory 92. The processor 91 shifts to the processing in ACT 91 explained above.

If determining that an expired prior registration is present (YES in ACT 94), the processor 111 deletes the relevant prior registration (ACT 98). For example, the processor 91 deletes a record of prior registration information determined as being expired among records of the prior registration information stored in the prior registration unit 925. The processor 91 shifts to the processing in ACT 91 explained above.

FIG. 19 is a flowchart for explaining an example of the operation of the visitor processing in ACT 5 explained above.

If determining in ACT 502 that the acquired information stored in the temporary storage unit 1126 is not a onetime password (NO in ACT 502), the processor 111 registers, in the temporary registration unit 11261 of the temporary storage unit 1126, the information stored in the temporary storage unit 1126 (ACT 521). For example, the processor 111 creates, in the temporary registration unit 11261, a record of visitor information to which a new visitor ID is allocated and temporarily registers, in the created record, the visiting destination and the basic information and the face image stored in the temporary storage unit 1126. A stay permitted time is not registered yet. If the registration in the temporary registration unit 11261 is completed, the processor 111 can delete temporary registration content stored in the temporary storage unit 1126.

If determining that the acquired information is a onetime password (YES in ACT 502), the processor 111 transmits the onetime password to the management server apparatus 90 with the network interface 12 through the network 70 (ACT 522).

Figure 20:
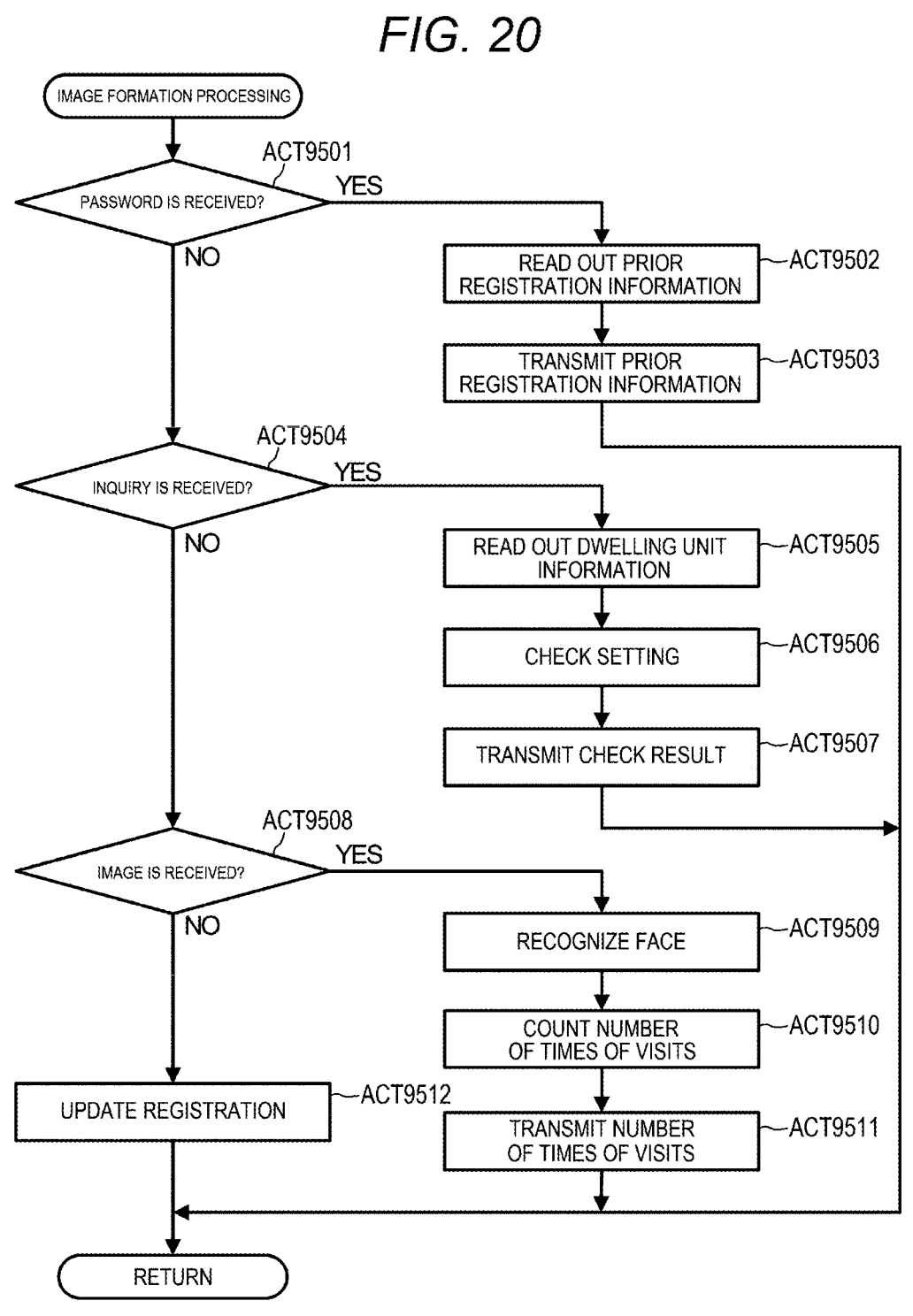

FIG. 20 is a flowchart for explaining an example of the operation of the image formation processing in ACT 95 executed by the processor 91 if the management server apparatus 90 receives the signal transmitted from the image forming apparatus 10.

First, the processor 91 of the management server apparatus 90 determines whether a onetime password is received (ACT 9501).

If determining that a onetime password is received (YES in ACT 9501), the processor 91 reads out prior registration information corresponding to the onetime password from the prior registration unit 925 of the memory 92 and causes the temporary storage unit 926 to store the prior registration information (ACT 9502). For example, the processor 91 searches through the records of the prior registration information stored in the prior registration unit 925 using the onetime password stored in the temporary storage unit 926 as a search key. The processor 91 reads out a vising destination, basic information, and a stay permitted time from a record of the prior registration information in which a matching onetime password is registered and causes the temporary storage unit 926 to store the visiting destination, the basic information, and the stay permitted time.

The processor 91 transmits the prior registration information stored in the temporary storage unit 926 to the image forming apparatus 10 with the network interface 93 through the network 70 (ACT 9503). The processor 91 ends the operation of the image formation processing in ACT 95 and shifts to the processing in ACT 91 explained above.

Referring back to FIG. 19, the processor 111 of the image forming apparatus 10 receives, with the network interface 12, the prior registration information transmitted from the management server apparatus 90 through the network 70 and causes the temporary storage unit 1126 to store the prior registration information (ACT 523).

The processor 111 shifts to the processing in ACT 521 explained above and temporarily registers, in the temporary registration unit 11261 of the temporary storage unit 1126, the information stored in the temporary storage unit 1126 (ACT 521). For example, the processor 111 creates, in the temporary registration unit 11261, a record of visitor information to which a new visitor ID is allocated and registers, in the record, the visiting destination, the basic information, and the stay permitted time in the prior registration information and the face image stored in the temporary storage unit 1126. Since the prior registration information includes the stay permitted time, the stay permitted time can be registered.

In ACT 9502, the processor 91 of the management server apparatus 90 may compare a scheduled date and time of the relevant record with the present date and time clocked by the timepiece 16 and, if the scheduled date and time is different by a predetermined time, for example, one hour or more, invalidate the prior registration information. In this case, the processor 91 returns an invalidity response indicating that the prior registration information is invalid to the image forming apparatus 10. Therefore, the processor 111 of the image forming apparatus 10, which receives the invalidity response, may inform, with the display of the user interface 13 or the speaker 17, that the visitor should input information by operating the user interface 13.

After completing the registration in the temporary registration unit 11261, the processor 111 of the image forming apparatus 10 transmits, with the network interface 12, an inquiry about whether a resident at a visiting destination is away from home to the management server apparatus 90 through the network 70 (ACT 522). For example, the processor 111 reads out a dwelling unit ID of the visiting destination and basic information of the visitor in the visitor information temporarily registered in the temporary registration unit 11261 and transmits an inquiry including the dwelling unit ID and the basic information.

Referring back to FIG. 20, if determining that a onetime password is not received (NO in ACT 9501), the processor 91 of the management server apparatus 90 determines whether an inquiry is received (ACT 9504).

If determining that an inquiry is received (YES in ACT 9504), the processor 91 reads out, from the dwelling unit database 923, dwelling unit information corresponding to a dwelling unit ID included in the inquiry and causes the temporary storage unit 926 to store the dwelling unit information (ACT 9505). For example, the processor 91 causes the temporary storage unit 926 to store the received inquiry. The processor 91 reads out, from the dwelling unit database 1123, all records of dwelling unit information having the dwelling unit ID included in the inquiry stored in the temporary storage unit 926 and causes the temporary storage unit 926 to store the records.

The processor 91 checks absence pretense setting based on the dwelling unit information stored in the temporary storage unit 926 (ACT 9506). For example, about dwelling unit information of all residents having the dwelling unit ID, the processor 91 checks absence scheduled periods and absence pretense settings. The processor 91 can determine that residents, in the absence scheduled periods of whom the present date and time clocked by the timepiece 96 is included, are away from home. The processor 91 reads out basic information of a visitor included in the inquiry stored in the temporary storage unit 926 and checks whether the visitor is included in visitors for whom the resident pretends to be absent in the absence pretense settings. If the visitor is a visitor for whom the resident pretends to be absent, the processor 91 determines that the resident is away from home. The processor 91 can determine whether a resident of the dwelling unit 80 at a visiting destination is away from home according to whether at least one resident determined as not being away from home is present in the dwelling unit 80 at the visiting destination.

The processor 91 transmits, with the network interface 93, a check result of the absence pretense setting to the image forming apparatus 10 through the network 70 (ACT 9507).

The processor 91 ends the operation of the image formation processing in ACT 95 and shifts to the processing in ACT 91 explained above.

Referring back to FIG. 19, the processor 111 of the image forming apparatus 10 receives, with the network interface 12, the check result transmitted from the management server apparatus 90 through the network 70 and causes the temporary storage unit 1126 to store the check result (ACT 525).

The processor 111 determines whether the resident of the dwelling unit 80 at the visiting destination is away from home (ACT 505). In this embodiment, the processor 111 can easily determine, according to the check result of the absence pretense setting stored in the temporary storage unit 1126, whether the resident of the dwelling unit 80 at the visiting destination is away from home.

If determining that the resident of the dwelling unit 80 at the visiting destination is not away from home (NO in ACT 505), as explained in the first embodiment, the processor 111 informs the dwelling unit 80 at the visiting destination that the visitor is present (ACT 506).

As explained in the first embodiment, the processor 111 determines, based on the determination signal indicating the stay permitted time or non-permission received from the intercom 82 of the dwelling unit 80 by the network interface 12, whether the visit of the visitor is permitted (ACT 507).

If determining that the visit is permitted (YES in ACT 507), the processor 111 updates the temporary registration content temporarily registered in the temporary registration unit 11261 (ACT 526). For example, the processor 111 registers the stay permitted time transmitted as the determination signal in a stay permitted time in visitor information about the visitor unregistered in the processing in ACT 506 explained above.

Thereafter, the processor 111 transmits a face image of the visitor to the management server apparatus 90 with the network interface 12 through the network 70 (ACT 527). For example, the processor 111 transmits the face image in the visitor information temporarily registered in the temporary registration unit 11261 about the visitor or a face image of the visitor acquired by the camera 18.

Referring back to FIG. 20, if determining that an inquiry is not received (NO in ACT 9504), the processor 91 of the management server apparatus 90 determines whether a face image is received (ACT 9508).

If determining that a face image is received (YES in ACT 508), the processor 91 causes the temporary storage unit 926 to store the received face image and recognizes a face of the visitor from the face image (ACT 9509). For example, the processor 91 extracts, with a well-known method, a feature value of the face of the visitor from the face image of the visitor stored in the temporary storage unit 926.

The processor 91 counts, based on the recognized face, the number of times the visitor visited the apartment house in the past (ACT 9510). For example, the processor 111 can search for, using the feature value of the face extracted in ACT 9509 as a search key, the face image in a record of visitor information in the past registered in the visitor registration unit 924 and acquire the number of hits as the number of times of visits.

The processor 91 transmits the counted number of times of visits to the image forming apparatus 10 with the network interface 93 through the network 70 (ACT 9511). The processor 91 ends the operation of the image formation processing in ACT 95 and shifts to the processing in ACT 91 explained above.

Referring back to FIG. 19, the processor 111 receives, with the network interface 12 of the image forming apparatus 10, the number of times of counting transmitted from the management server apparatus 90 through the network 70 and causes the temporary storage unit 1126 to store the number of times of counting (ACT 528).

The processor 111 issues an RFID medium based on the content of the visitor information about the visitor temporarily registered in the temporary registration unit 11261 and the number of times of visits indicated by the number of times of counting stored in the temporary storage unit 1126 (ACT 511). For example, the processor 111 controls the RFID reader writer 15 to write, in an RFID of an RFID medium, as RFID writing information, a visitor ID, a visiting destination, basic information, a visiting time, and a stay permitted time. The processor 111 controls the image forming unit 14 to form, on the surface of the RFID medium, an image capable of distinguishing the content of the basic information with a color or a pattern and an image representing the number of times of visits. An image of star marks or lines corresponding to the number of times of visits is formed on the surface of the RFID medium, for example, in blue if a job type of the visitor is sales or in pink if the job type of the visitor is delivery. If the number of visitors in the basic information is plural, the processor 111 issues RFID media for the number of visitors.

If the processor 111 issues the RFID medium in this way, the processor 111 transmits an issuance report of the RFID medium to the management server apparatus 90 with the network interface 12 through the network 70 (ACT 529). For example, the processor 111 transmits an issuance report including the visitor information temporarily registered in the temporary registration unit 11261 and issuance use information indicating that the RFID medium for the visitor is issued.

Thereafter, the processor 111 deletes the visitor information temporarily registered in the temporary registration unit 11261 (ACT 530). The processor 111 ends the operation of the visitor processing in ACT 5 and shifts to the processing in ACT 1 explained above.

Referring back to FIG. 20, if determining that a face image is not received (NO in ACT 9508), the processor 91 of the management server apparatus 90 regards that the received signal is an issuance report and updates the registration content based on the issuance report (ACT 9512). For example, the processor 111 causes the temporary storage unit 926 to store the received issuance report. If issuance use information included in the issuance report indicates that the RFID medium for the visitor is issued, the processor 91 adds a record based on the visitor information included in the issuance report to the visitor registration unit 924. The processor 91 ends the operation of the image formation processing in ACT 95 and shifts to the processing in ACT 91 explained above.

On the other hand, if determining that the resident of the dwelling unit 80 at the visiting destination is away from home (YES in ACT 505) or if determining that the visit is not permitted (NO in ACT 507), as in the first embodiment, the processor 111 determines whether the visitor is a deliverer (ACT 512).

If determining that the visitor is not a deliverer (NO in ACT 512), as in the first embodiment, the processor 111 causes the display of the user interface 13 to display to the effect that the resident of the dwelling unit 80 at the visiting destination is absent (ACT 513). Thereafter, in this embodiment, the processor 111 shifts to the processing in ACT 530 explained above and deletes the visitor information temporarily registered in the temporary registration unit 11261.

In contrast, if determining that the visitor is a deliverer (YES in ACT 512), as in the first embodiment, the processor 111 issues an RFID medium (ACT 514). However, in this embodiment, the processor 111 issues an RFID medium based on the content of the visitor information temporarily registered in the temporary registration unit 11261. For example, the processor 111 controls the RFID reader writer 15 to write, in an RFID of the RFID medium, a visitor ID, a visiting destination, basic information, a visiting time, and a stay permitted time as RFID writing information. In this case, the stay permitted time is blank. The processor 111 controls the image forming unit 14 to form, on the surface of the RFID medium, an image capable of distinguishing content of the basic information with a color or a pattern. In this case, since a job type of the visitor is delivery, an image indicating the visiting destination is formed on the surface of the RFID medium, for example, in pink.

As in the first embodiment, the processor 111 causes the display of the user interface 13 to display a package drop instruction (ACT 515).

Thereafter, in this embodiment, the processor 111 shifts to the processing in ACT 529 explained above and transmits an issuance report of the RFID medium to the management server apparatus 90 with the network interface 12 through the network 70 (ACT 529). For example, in this case, the processor 111 transmits an issuance report including the visitor information temporarily registered in the temporary registration unit 11261 and issuance use information indicating that an RFID medium for package drop is issued.

Accordingly, in ACT 9512, the processor 91 of the management server apparatus 90, which receives the issuance report, updates the registration content based on the issuance report (ACT 9512). For example, the processor 111 causes the temporary storage unit 926 to store the received issuance report. If the issuance use information included in the issuance report indicates that the RFID medium for package drop is issued, the processor 91 adds a record based on the visitor information included in the issuance report to the visitor registration unit 924 and sets, based on a dwelling unit ID, which is the visiting destination in the visitor information, a package drop flag about all records of dwelling unit information having the dwelling unit ID in the dwelling unit database 1123, that is, records of all residents having the dwelling unit ID.

As explained above, if the security management apparatus is configured by the management server apparatus 90 and the image forming apparatus 10, it is possible to achieve the same effects as the effects in the first embodiment.

Third Embodiment

A third embodiment is explained. The same components and operations as the components and the operations in the second embodiment explained above are denoted by the same reference numerals and signs as the reference numerals and signs in the second embodiment to omit explanation of the components and the operations. Differences from the second embodiment are explained below.

Unlike the second embodiment, a security management apparatus is not configured by the management server apparatus 90 and the image forming apparatus 10. The image forming apparatus 10 is treated as a terminal that performs only an interface operation with a visitor and an issuing operation for an RFID medium. The management server apparatus 90 is enabled to perform all controls. The processor 111 of the image forming apparatus 10 in this case transmits a visiting destination and basic information input by a visitor using the user interface 13 and a face image captured by the camera 18 to the management server apparatus 90, receives, from the management server apparatus 90, RFID writing information to be written in an RFID of an RFID medium and printing data of an image to be formed on the surface of the RFID medium, and issues the RFID medium.

Figure 21:
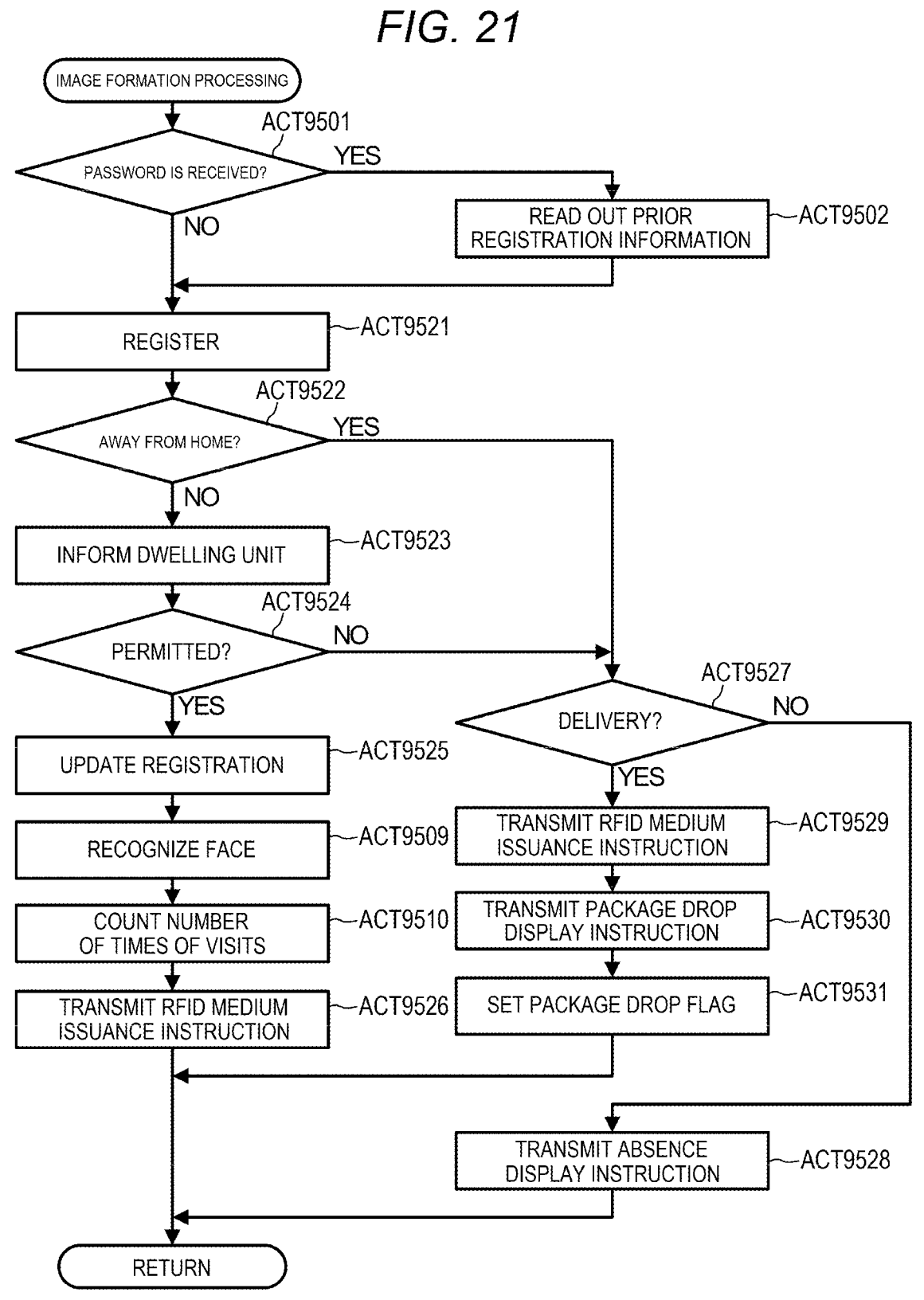

FIG. 21 is a flowchart for explaining an example of the operation of the image formation processing in ACT 95 executed by the processor 91 if the management server apparatus 90 functioning as a security management apparatus according to the third embodiment receives a signal from the image forming apparatus 10.

First, the processor 91 of the management server apparatus 90 determines whether a onetime password and a face image are received from the image forming apparatus 10 (ACT 9501).

If determining that a onetime password and a face image are not received (NO in ACT 9501), the processor 91 temporarily stores the received signal in the temporary storage unit 926 and registers the stored signal in the visitor registration unit 924 (ACT 9521). A received signal not having a onetime password is a visiting destination and basic information, which are input information input by a visitor. Therefore, for example, the processor 91 creates a record of visitor information to which a new visitor ID is allocated and registers, in the created record, a visiting destination and basic information and a face image stored in the temporary storage unit 926. A stay permitted time is not recorded yet. If the registration in the visitor registration unit 924 is completed, the processor 91 can delete the information stored in the temporary storage unit 926.

If determining that a onetime password is received (YES in ACT 9501), as explained in the second embodiment, the processor 91 reads out prior registration information corresponding to the onetime password from the prior registration unit 925 of the memory 92 and causes the temporary storage unit 926 to store the prior registration information (ACT 9502).

If reading out the prior registration information corresponding to the onetime password in this way, the processor 91 proceeds to the processing in ACT 9521 explained above and registers, in the visitor registration unit 924, the information stored in the temporary storage unit 926 (ACT 9521). For example, the processor 91 creates, in the visitor registration unit 924, a record of visitor information to which a new visitor ID is allocated and registers, in the record, the visiting destination, the basic information, and the stay permitted time in the prior registration information and the face image stored in the temporary storage unit 926. Since the prior registration information includes the stay permitted time, the stay permitted time can be registered.

After completing the registration in the visitor registration unit 924, the processor 91 determines whether a resident of the dwelling unit 80 at the visiting destination is away from home (ACT 95225). Processing content of this processing operation is the same as the processing in ACT 505 in the image forming apparatus 10 explained in the first embodiment except that an operation entity is the processor 91 and a reference destination at an operation time is the dwelling unit database 923.

If determining that the resident of the dwelling unit 80 at the visiting destination is not away from home (NO in ACT 9522), the processor 91 informs the dwelling unit 80 at the visiting destination that a visitor is present (ACT 9523). Processing content of this processing operation is the same as the processing in ACT 506 in the image forming apparatus 10 explained in the first embodiment except that the operation entity is the processor 91.

The processor 91 determines, based on a determination signal received by the network interface 93, whether a visit of the visitor is permitted (ACT 9524). Processing content of this processing operation is the same as the processing in ACT 507 in the image forming apparatus 10 explained in the first embodiment except that the operation entity is the processor 91.

If determining that the visit is permitted (YES in ACT 9524), the processor 91 updates registration content of the visitor registration unit 924 (ACT 9525). Processing content of this processing operation is the same as the processing in ACT 508 in the image forming apparatus 10 explained in the first embodiment except that the operation entity is the processor 91 and the reference destination at the operation time is the visitor registration unit 924.

The processor 91 recognizes a face of the visitor (ACT 9509). Processing content of this processing operation is the same as the processing in ACT 509 in the image forming apparatus 10 explained in the first embodiment except that the operation entity is the processor 91 and the reference destination at the operation time is the visitor registration unit 924.

The processor 111 counts, based on the recognized face, the number of times the visitor visited the apartment house in the past (ACT 9510). Processing content of this processing operation is the same as the processing in ACT 510 in the image forming apparatus 10 explained in the first embodiment except that the operation entity is the processor 91 and the reference destination at the operation time is the visitor registration unit 924.

The processor 91 transmits an RFID medium issuance instruction to the image forming apparatus 10 with the network interface 93 through the network 70 (ACT 9526). For example, the processor 91 transmits an RFID medium issuance instruction including content of a record of visitor information about the visitor in the visitor registration unit 924 and the number of times of visits counted in ACT 9510. As explained in ACT 511 in the first embodiment, the image forming apparatus 10, which receives the RFID medium issuance instruction, writes, in an RFID of the RFID medium, a visitor ID, a visiting destination, basic information, a visiting time, and a stay permitted time as RFID writing information and forms, on the surface of the RFID medium, an image capable of distinguishing content of the basic information with a color or a pattern to issue the RFID medium. The processor 91 ends the operation of the image formation processing in ACT 95 and shifts to the processing in ACT 91 explained above.

On the other hand, if determining that the resident of the dwelling unit 80 at the visiting destination is away from home (YES in ACT 9522) or determining that the visit is not permitted (NO in ACT 9524), the processor 91 determines whether the visitor is a deliverer (ACT 9527). Processing content of this processing operation is the same as the processing in ACT 512 in the image forming apparatus 10 explained in the first embodiment except that the operation entity is the processor 91 and the reference destination at the operation time is the visitor registration unit 924.

If determining that the visitor is not a deliverer (NO in ACT 9527), the processor 91 transmits an absence display instruction to the image forming apparatus 10 with the network interface 93 through the network 70 (ACT 9528). As in ACT 513 in the first embodiment, the image forming apparatus 10, which receives the absence display instruction, displays, on the display of the user interface 13, to the effect that the resident of the dwelling unit 80 at the visiting destination is absent. The processor 91 ends the operation of the image formation processing in ACT 95 and shifts to the processing in ACT 91 explained above.

In contrast, if determining that the visitor is a deliverer (YES in ACT 9527), the processor 91 transmits an RFID medium issuance instruction to the image forming apparatus 10 with the network interface 93 through the network 70 (ACT 9526). For example, the processor 91 transmits an RFID medium issuance instruction including content of a record of visitor information about the visitor in the visitor registration unit 924. As explained in ACT 514 in the first embodiment, the image forming apparatus 10, which receives the RFID medium issuance instruction, writes, in an RFID of the RFID medium, a visitor ID, a visiting destination, basic information, a visiting time, and a stay permitted time as RFID writing information and forms, on the surface of the RFID medium, an image capable of distinguishing content of the basic information with a color or a pattern to issue the RFID medium.

The processor 91 transmits a package drop display instruction to the image forming apparatus 10 with the network interface 93 through the network 70 (ACT 9530). As in ACT 515 in the first embodiment, the image forming apparatus 10, which receives the package drop display instruction, displays, on the display of the user interface 13, a package drop instruction, which is a message for sticking the issued RFID medium to a package to urge the visitor to place the package in a predetermined package drop position such as a delivery box.

The processor 91 sets a package drop flag about all records of dwelling unit information having the dwelling unit ID of the dwelling unit 80 in the dwelling unit database 923, that is, about records of all residents having the dwelling unit ID (ACT 9531). Processing content of this processing operation is the same as the processing in ACT 516 in the image forming apparatus 10 explained in the first embodiment except that the operation entity is the processor 91 and an operation target is the dwelling unit database 923. The processor 91 ends the operation of the image formation processing in ACT 95 and shifts to the processing in ACT 91 explained above.

As explained above, the management server apparatus 90 functioning as the security management apparatus according to this embodiment acquires, from the image forming apparatus 10, which is a first input apparatus, disposed in an entrance, for example, an entrance hall of a facility including a plurality of visiting destinations like an apartment house such as a condominium, about a visitor to a specific visiting destination such as a specific dwelling unit 80, basic information including at least one of an attribute, relation information, and a visiting purpose and acquires a stay permitted time from a second input apparatus such as the intercom 82 of the dwelling unit 80 or the like at a visiting destination. The management server apparatus 90 transmits the acquired basic information and the acquired stay permitted time to the image forming apparatus 10, which is an issuing apparatus, and causes the issuing apparatus to issue an RFID medium, which is a portable medium that stores the basic information and the stay permitted time and on the surface of which an image capable of distinguishing content of the basic information is recorded. The management server apparatus 90 receives, from a reading device such as the RFID reader 50 or the RFID gate 20 that is disposed in the facility, for example, the entrance hall and reads the stay permitted time from the portable medium in a noncontact manner, the read stay permitted time and, if the stay permitted time already elapsed, emits warning sound or a message from the speaker 60, 23 or the like to warn a visitor passing a disposition position of the reading device.

Accordingly, the same effects as the effects in the first embodiment can be achieved by the security management apparatus according to this embodiment.

OTHER EMBODIMENTS

In the embodiments explained above, the security system 1 detects, for example, by the detector, using the sensor 30, a suspicious person passing the RFID gate 20 without having an RFID medium and emits a warning and an alarm. However, the security system 1 may not include the sensor 30 and emit a warning and an alarm based on only reading of the RFID medium.

The image forming apparatus 10 may be an image forming apparatus that can use decolorable toner for image formation. The RFID medium can be reused by enabling the decolorable toner to be used in this way.

In the embodiments explained above, the RFID technology is used. However, other technologies may be used. For example, the image forming apparatus 10 records, in addition to the image capable of distinguishing the content of the basic information, the basic information and the stay permitted time on the portable medium surface as a two-dimensional code image. In this case, a two-dimensional code reader only has to be disposed instead of the RFID readers 22 and 50. The same effects as the effects in the embodiments can be achieved in this way.

A smart terminal carried by a visitor may be used as the portable medium. For example, the image forming apparatus 10 is capable of replacing the RFID medium by transferring the basic information and the stay permitted time to a smart terminal incorporating a short range wireless communication device such as an NFC (Near Field Communication) device and causing a display of the smart terminal to display the image capable of distinguishing the content of the basic information. Consequently, it is possible to cut the cost of the RFID medium.

If the RFID gates 20 are disposed in the passageways for moving from the entrance hall to the dwelling units 80, the RFID reader 50 or the RFID gate 20 disposed on the entrance hall side with respect to the auto-lock door 40 in the boundary between the entrance hall and the passageway may be omitted. In this case, the image forming apparatus 10 unlocks the auto-lock door 40 or automatically open a door simultaneously with issuing the RFID medium or after a waiting time based on the distance from the image forming apparatus 10 to the auto-lock door 40. Therefore, the door may be the auto-lock door 40.

The order of the processing illustrated in the flowcharts of FIGS. 7 to 12 and FIGS. 17 to 21 is an example. The processing is not limited to this order. For example, the order of ACT 514 and ACT 515 in FIG. 8 may be opposite. The processing order or the like of the respective kinds of processing may be changed or the respective kinds of processing may be performed in parallel unless inconsistency with the preceding or following processing occurs. The functions explained in the embodiments are not limited to be configured using hardware and can also be realized by causing, using software, a computer to read programs describing the functions. The functions may be configured by selecting the software or the hardware as appropriate.

The several embodiments are explained above. However, these embodiments are presented as examples and are not intended to limit the scope of the invention. These new embodiments can be implemented in other various forms. Various omissions, substitutions, and changes can be made without departing from the spirit of the invention. These embodiments and modifications of the embodiments are included in the scope and the gist of the invention and included in the inventions described in claims and the scope of equivalents of the inventions.

What is claimed is:

1. A security system comprising:
- an input interface configured to receive an input of information from a visitor, the information being about the visitor visiting to a specific visiting destination;
- a query processor configured to send an inquiry to a visiting destination based on the information and receive, from the visiting destination, a stay permitted time that is a time input by a person accepting the visitor at the visiting destination; and
- a printer configured to:
  - generate a portable medium, the portable medium comprising the information and the stay permitted time, and
  - record, on a surface of the portable medium, an image allowing distinguishing of content of the information; and
- a notifier configured to:
  - receive the stay permitted time;
  - read the stay permitted time from the portable medium; and
  - warn the visitor and an administrator of a facility, the facility including a plurality of visiting destinations, in response to the stay permitted time being elapsed,
- wherein the query processor is further configured to:
  - receive an absence time input from the visiting destination;
  - determine, based on the information from the visitor, whether the visitor is a deliverer; and
  - in response to determining that the visitor is a deliverer, determine the stay permitted time based on the absence time.

2. The security system according to claim 1, wherein the input interface is configured to receive, at an entrance of the facility, the information about the visitor visiting to the specific visiting destination of the facility.

3. The security system according to claim 2, wherein the input interface is configured to receive at least one of an attribute, relation information, or a visiting purpose.

4. The security system according to claim 1, wherein the notifier warns the visitor and the administrator, the visitor who passes a disposition position of the notifier.

5. The security system according to claim 1, wherein the query processor is further configured to:
- receive a determination signal from the visiting destination, and
- in response to the determination signal including the stay permitted time input at the visiting destination, determine that a visit of the visitor to the visiting destination is permitted.

6. The security system according to claim 1, wherein the printer is further configured to:
- in response to determining that the visitor is a deliverer delivering a package, generate a second portable medium for the package.

7. The security system according to claim 6, further comprising:
- a second printer disposed in the visiting destination and configured to:

rewrite the stay permitted time of the portable medium according to rewriting content received from the query processor.

8. A method for causing a computer for a security system to carry out operations comprising:

receiving, by an input interface, an input of information from a visitor, the information being about the visitor visiting to a specific visiting destination;

sending, by a query processor, an inquiry to a visiting destination based on the information;

receiving, by the query processor from the visiting destination, a stay permitted time that is a time input by a person accepting the visitor at the visiting destination;

generating, by a printer, a portable medium, the portable medium comprising the information and the stay permitted time;

recording, by the printer, on a surface of the portable medium, an image allowing distinguishing of content of the information;

receiving, by a notifier, the stay permitted time;

reading, by the notifier, the stay permitted time from the portable medium;

warning, by the notifier, the visitor and an administrator of a facility, the facility including a plurality of visiting destinations, in response to the stay permitted time being elapsed;

receiving, by the query processor, an absence time input from the visiting destination;

determining, by the query processor based on the information from the visitor, whether the visitor is a deliverer; and in response to determining that the visitor is a deliverer, determining, by the query processor, the stay permitted time based on the absence time.

9. The method according to claim 8, further comprising:

receiving, by the input interface, at an entrance of the facility, information about the visitor visiting to the specific visiting destination of the facility.

10. The method according to claim 9, further comprising:

receiving, by the input interface, at least one of an attribute, relation information, or a visiting purpose.

11. The method according to claim 8, further comprising:

warning, by the notifier, the visitor and the administrator, the visitor who passes a disposition position of the notifier.

12. The method according to claim 8, further comprising:

receiving, by the query processor, a determination signal from the visiting destination; and in response to the determination signal including the stay permitted time input at the visiting destination, determining, by the query processor, that a visit of the visitor to the visiting destination is permitted.

13. The method according to claim 8, further comprising:

in response to determining that the visitor is a deliverer delivering a package, generating, by the printer, a second portable medium for the package.

14. The method according to claim 13, further comprising:

rewriting, by a second printer disposed in the visiting destination, the stay permitted time of the portable medium according to rewriting content received from the query processor.

15. A non-transitory computer readable medium configured to include instructions which, when executed by a processor, cause the processor to carry out operations comprising:

receiving, by an input interface, an input of information from a visitor, the information being about the visitor visiting to a specific visiting destination;

sending, by a query processor, an inquiry to a visiting destination based on the information;

receiving, by the query processor from the visiting destination, a stay permitted time that is a time input by a person accepting the visitor at the visiting destination;

generating, by a printer, a portable medium, the portable medium comprising the information and the stay permitted time;

recording, by the printer, on a surface of the portable medium, an image allowing distinguishing of content of the information;

receiving, by a notifier, the stay permitted time;

reading, by the notifier, the stay permitted time from the portable medium; and warning, by the notifier, the visitor and an administrator of a facility, the facility including a plurality of visiting destinations, in response to the stay permitted time being elapsed;

receiving, by the query processor, an absence time input from the visiting destination;

determining, by the query processor based on the information from the visitor, whether the visitor is a deliverer; and in response to determining that the visitor is a deliverer, determining, by the query processor, the stay permitted time based on the absence time.

16. The non-transitory computer readable medium according to claim 15, wherein the operations further comprise:

receiving, by the input interface, at an entrance of the facility, information about the visitor visiting to the specific visiting destination of the facility.

17. The non-transitory computer readable medium according to claim 16, wherein the operations further comprise:

receiving, by the input interface, at least one of an attribute, relation information, or a visiting purpose.

18. The non-transitory computer readable medium according to claim 15, wherein the operations further comprise:

warning, by the notifier, the visitor and the administrator, the visitor who passes a disposition position of the notifier.

19. The non-transitory computer readable medium according to claim 15, wherein the operations further comprise:

receiving, by the query processor, a determination signal from the visiting destination; and in response to the determination signal including the stay permitted time input at the visiting destination, determining, by the query processor, that a visit of the visitor to the visiting destination is permitted.

20. The non-transitory computer readable medium according to claim 15, wherein the operations comprise:

in response to determining that the visitor is a deliverer delivering a package, generating, by the printer, a second portable medium for the package.

21. The non-transitory computer readable medium according to claim 20, wherein the operations comprise:

rewriting, by a second printer disposed in the visiting destination, the stay permitted time of the portable medium according to rewriting content received from the query processor.

* * * * *